US006558038B2

(12) United States Patent
Teramach et al.

(10) Patent No.: US 6,558,038 B2
(45) Date of Patent: May 6, 2003

(54) ROLLING GUIDE DEVICE AND DRIVE SYSTEM USING ROLLING GUIDE DEVICE

(75) Inventors: Akihiro Teramach, Tokyo-to (JP); Takeki Shirai, Tokyo-to (JP); Kaoru Hoshide, Tokyo-to (JP)

(73) Assignee: THK Co., Ltd., Tokyo (JP)

( * ) Notice: Subject to any disclaimer, the term of this patent is extended or adjusted under 35 U.S.C. 154(b) by 7 days.

(21) Appl. No.: 09/804,222

(22) Filed: Mar. 13, 2001

(65) Prior Publication Data

US 2001/0022868 A1 Sep. 20, 2001

(30) Foreign Application Priority Data

| Mar. 13, 2000 | (JP) | 2000-073932 |
| Dec. 1, 2000 | (JP) | 2000-367605 |
| Feb. 14, 2001 | (JP) | 2001-037486 |

(51) Int. Cl.[7] .................................................. F16L 29/06
(52) U.S. Cl. ......................................................... 384/45
(58) Field of Search ..................................... 384/45, 43

(56) References Cited

U.S. PATENT DOCUMENTS

| 3,086,824 | A | * | 4/1963 | Barkley ........................ 384/43 |
| 4,681,506 | A | | 7/1987 | Teramachi |
| 4,744,551 | A | | 5/1988 | Chitayat |
| 4,799,806 | A | * | 1/1989 | Seki ............................. 384/45 |
| 4,806,022 | A | * | 2/1989 | Takahiro ..................... 384/45 |
| 5,242,227 | A | * | 9/1993 | Komiya et al. ............... 384/45 |
| 5,244,282 | A | * | 9/1993 | Imai et al. .................... 384/43 |
| 5,388,914 | A | * | 2/1995 | Takei ........................... 384/45 |
| 5,825,104 | A | | 10/1998 | Kondo et al. |
| 6,135,638 | A | * | 10/2000 | Agari .......................... 384/13 |
| 6,309,107 | B1 | * | 10/2001 | Ueki et al. ................... 384/45 |
| 6,328,474 | B1 | * | 12/2001 | Fujiwara et al. ............. 384/13 |

FOREIGN PATENT DOCUMENTS

| DE | 41 15 557 A1 | 5/1991 | |
| FR | 2048602 | 3/1971 | |
| GB | 2135400 | * 8/1984 | .................. 384/45 |
| JP | 62-8765 | 2/1987 | |

* cited by examiner

*Primary Examiner*—Christopher P. Schwartz
*Assistant Examiner*—Devon Kramer
(74) *Attorney, Agent, or Firm*—Armstrong, Westerman & Hattori, LLP

(57) ABSTRACT

A rolling guide device comprises: a track rail formed with a rolling member rolling surface extending along a longitudinal direction thereof; a movable rail formed with a loaded rolling member rolling surface extending along a longitudinal direction thereof so as to oppose to the rolling member rolling surface of the track rail; a track rail side rolling member circulation passage formed to the track rail so as to circulate the rolling members rolling between the track rail and the movable rail; a movable rail side rolling member circulation passage formed to the movable rail so as to circulate the rolling members rolling between the track rail and the movable rail; and a number of rolling members disposed and arranged in the track rail side rolling member circulation passage and the movable rail side rolling member circulation passage. A drive system comprises such rolling guide device and linear motors having a primary side mounted to either one of the track rail and the movable rail and a secondary side mounted to another one of the track rail and the movable rail.

6 Claims, 22 Drawing Sheets

ROLLING GUIDE DEVICE AND DRIVE SYSTEM USING ROLLING GUIDE DEVICE

The present application claims priority under 35 U.S.C § 119 to Japanese Patent Application No.2000-073932 filed Mar. 13, 2000 entitled "ROLLING GUIDE DEVICE", No.2000-367605 filed Dec. 1, 2000 entitled "ROLLING GUIDE DEVICE AND DRIVE SYSTEM USING ROLLING GUIDE DEVICE", and No.2001-037486 filed Feb. 14, 2001 entitled "ROLLING GUIDE DEVICE AND DRIVE SYSTEM USING ROLLING GUIDE DEVICE". The contents of that application are incorporated herein by reference in their entirety.

BACKGROUND OF THE INVENTION

1. Field of the Invention

The present invention relates to a rolling guide device in which a movable rail is made slidable with respect to a track rail and also relates to a drive system using such a rolling guide device.

2. Description of the Related Art

As a rolling guide device in which a movable rail is made slidable with respect to a track rail, there has been known a slide rail such as shown in FIG. 25 (see Japanese Utility Model Publication No. SHO 62-8765). Such slide rail comprises a track rail member 1 having an opened recess 1a (i.e., having substantially ⊐-shaped (box-shaped) cross section) formed by both inner side surfaces 1b, 1b and a bottom surface 1c and a movable rail member 2 which is supported between both the inner side surfaces 1b, 1b of the track rail member 1 to be movable in the longitudinal direction thereof. The movable rail member 2 also has an opened recess 2a (i.e., having substantially ⊐-shaped (box-shaped) cross section).

The track rail member 1 and the movable rail member 2 have substantially the same longitudinal length. The inner side surfaces 1b of the track rail member 1 are formed with ball rolling grooves, respectively, along which balls roll in the longitudinal direction thereof, and outer side surfaces 2b of the movable rail member 2 are also formed with loaded ball rolling grooves, respectively, so as to extend in the longitudinal direction thereof and to oppose the ball rolling grooves formed to the track rail member 1.

A number of balls 3 are arranged and housed between these ball rolling grooves and loaded ball rolling grooves, and these balls 3 are held by a cage 4 to be rotatable and slidable. When the movable rail member 2 slides with respect to the track rail member 1 in the longitudinal direction thereof, these balls 3 roll and, hence, the slide rail becomes smoothly expandable or contractive.

Further, though not shown, there is also known a cam-follower type drawer device of a structure that is movable and track rails are both provided with wheels so that the movable rail is drawn with respect to the track rail, as a rolling guide device in which a movable rail is slidable with respect to a track rail.

However, in the conventional slide rail such as mentioned above, a number of balls 3 disposed and arranged between the track rail member 1 and the movable rail member 2 do not completely perform the rolling motion and will roll with a slight sliding motion. In the conventional slide rail, because the balls 3 do not circulate and only reciprocally move along the loaded rolling passage between the ball rolling grooves and the loaded ball rolling grooves, if the balls 3 slide, the cage 4 supporting (bearing) the balls 3 would be displaced from the initial position. As a result, in spite of the fact that an effective stroke of the movable rail member 2 is not achieved, the cage 4 collides with a stopper 5 of the track rail member 1 and, hence, such effective stroke could not be obtained. In this case, when it is required to slide the movable rail member 2 with the cage 4 colliding with the stopper 5, the movable rail member 2 will slide with the balls 3 being slipped, and accordingly, a large force is required to move the movable rail member 2.

Furthermore, in the conventional structure of the slide rail, in order to obtain a large stroke of the movable rail member 2, it is necessary for the movable rail member 2 to once come off from a portion at which the balls 3 exist and then to be engaged with that portion at which the balls 3 exist. That is, in the case where the movable rail member 2 comes off from the portion at which the balls 3 exist, for example, the movable rail member 2 which has been loaded with ten (10) balls 3 is loaded with, for example, six (6) balls 3, and hence, the ability for bearing moment load, radial load and thrust load is deteriorated.

Moreover, with the cam-follower type drawer device, because the wheels generally have backlash or looseness, the movable rail member 2 does not smoothly slide, and furthermore, because the wheel has a cylindrical structure, a direction along which a load is received is determined, and hence, the thrust load cannot be received.

SUMMARY OF THE INVENTION

An object of the present invention is to substantially eliminate defects or drawbacks encountered in the prior art mentioned above and to provide a rolling guide device capable of taking a large expansion/contraction stroke and sufficiently bearing moment load, radial load and thrust load at any expanded (contracted) attitude and also provide a drive system incorporated with such a rolling guide device.

This and other objects can be achieved according to the present invention by providing, in one aspect, a rolling guide device comprising:

- a track rail formed with a rolling member rolling surface extending along a longitudinal direction thereof;
- a movable rail formed with a loaded rolling member rolling surface extending along a longitudinal direction thereof so as to oppose the rolling member rolling surface of the track rail;
- a track rail side rolling member circulation passage formed to the track rail so as to circulate the rolling members rolling between the track rail and the movable rail;
- a movable rail side rolling member circulation passage formed to the movable rail so as to circulate the rolling members rolling between the track rail and the movable rail; and
- a number of rolling members disposed and arranged in the track rail side rolling member circulation passage and the movable rail side rolling member circulation passage.

According to this aspect, when the movable rail slides with respect to the track rail, the rolling members arranged between the track rail and the movable rail endlessly circulate in the track rail side rolling member circulation passage and the movable rail side rolling member circulation passage while rolling therealong. As mentioned, because the rolling members circulate in the endless manner, even if the rolling member slides during the rolling motion, there is no causing of a case that a cage is shifted from the initial position as in the conventional structure, and hence, a large expansion (contraction) stroke is obtainable. Furthermore, in an optional expanded (contracted) attitude, there remains a considerable distance between the track rail side rolling member circulation passage and the movable rail side rolling member circulation passage, so that a rolling guide device, which can bear even the moment load, can be realized.

Further, when the movable rail slides and its stroke is made large, the considerable distance corresponding to this stroke is made short and the capability of bearing the moment load is reduced. However, according to the present invention, the movable rail does not come off from the balls, so that the capability of bearing the moment load is not extremely reduced. Moreover, because the movable rail does not come off from the balls and the number of the rolling members supported at an optional expansion (contraction) attitude is not changed, in contrast to the conventional slide rail, there can be provided a rolling guide device bearing the constant radial load and thrust load.

In the above aspect, the following preferred embodiments or examples may be provided with advantageous functions and effects thereof.

The track rail side rolling member circulation passage is formed in one longitudinal end side of the track rail and the movable rail side rolling member circulation passage is formed in one longitudinal end side, opposing that one end side of the track rail, of the movable rail.

Accordingly, the distance between the track rail side rolling member circulation passage and the movable rail side rolling member circulation passage can be made large, so that a rolling guide device bearing the large moment load can be provided.

Furthermore, the track rail has an opened recess having a ⊐-shaped section and has inside surfaces to which the rolling member rolling surfaces are formed, the movable rail is fitted into the recess of the track rail, and the movable rail has outside surfaces to which the loaded rolling member rolling surfaces are formed so as to oppose the rolling member rolling surfaces formed to the track rail inside surfaces.

Thus, various kinds of loads including radial load, thrust load and moment load can be supported in a balanced condition.

The track rail side rolling member circulation passage is provided with a rolling member return passage substantially parallel to the rolling member rolling surface and a rolling direction changing passage communicating the rolling member rolling surface and the rolling member return passage, the movable rail side rolling member circulation passage is provided with a trolling member return passage substantially parallel to the loaded rolling member rolling surface and a rolling direction changing passage communicating the rolling member rolling surface and the rolling member return passage, the rolling direction changing passages of the track rail side rolling member circulation passage and the movable rail side rolling member circulation passage are formed to a deflector which is formed independently from a track rail body and a movable rail body, and the deflector is fitted to holes formed in the track rail body and movable rail body from the side portions thereof.

According to this embodiment, the rolling direction changing passages can be easily formed in the long track rail and movable rail.

The return passages are drilled in the track rail body and the movable rail body from the longitudinal end portions thereof.

According to this embodiment, the return passages can be easily formed in the long track rail and movable rail.

The deflector is composed of a plurality of sections splittable along the rolling direction changing passages.

Accordingly, the rolling direction changing passages having a complicated structure may be easily formed in the deflector.

The deflector is made of a synthetic resin.

Accordingly, the rolling direction changing passages having a complicated structure may be easily formed in the deflector, and moreover, noise which may be generated when the rolling members roll in the rolling direction changing passages will be suppressed.

The above mentioned object of the present invention can be also achieved by providing, in another aspect, a drive system comprising:

a track rail formed with a rolling member rolling surface extending along a longitudinal direction thereof;

a movable rail formed with a loaded rolling member rolling surface extending along a longitudinal direction thereof so as to oppose the rolling member rolling surface of the track rail;

a track rail side rolling member circulation passage formed on the track rail so as to circulate the rolling members rolling between the track rail and the movable rail;

a movable rail side rolling member circulation passage formed on the movable rail so as to circulate the rolling members rolling between the track rail and the movable rail;

a number of rolling members disposed and arranged in the track rail side rolling member circulation passage and the movable rail side rolling member circulation passage; and a linear motor means having a primary side mounted to either one of the track rail and the movable rail and a secondary side mounted to another one of the track rail and the movable rail.

According this aspect, the expansion (contraction) stroke can be made large and the moment load, the radial load and the thrust load can be sufficiently supported at an optional attitude of the system. Furthermore, because the linear motors are incorporated between the track rail and the movable rail, the use of the ball screw or like can be eliminated, thus moving the movable rail at high speed with less noise. Moreover, because it is not necessary to provide a space for a rotary motor, the drive system can be made thin and compact.

According to preferred embodiments or examples of this aspect, the following advantageous functions and effects may be attained.

The track rail side rolling member circulation passage is formed in one longitudinal end side of the track rail and the movable rail side rolling member circulation passage is formed in one longitudinal end side, opposing that one end side of the track rail, of the movable rail, and the linear motor means comprises first and second linear motors, the first linear motor having a primary side mounted to a portion near the track rail side rolling member circulation passage of the track rail, the second linear motor having a secondary side mounted to the track rail along the longitudinal direction thereof so as to be continuous to the primary side of the first linear motor, and the second linear motor having a primary side mounted to a portion near the movable rail side rolling member circulation passage of the movable rail, the first linear motor having a secondary side mounted to the movable rail along the longitudinal direction thereof so as to be continuous to the primary side of the second linear motor.

According to this embodiment, because two sets of linear motors are incorporated in the drive system, the thrust force can be made two times (twice), and the excitation is averaged to thereby make smooth the movement of the movable rail. Furthermore, the first linear motor has a primary side mounted to a portion near the track rail side rolling member circulation passage of the track rail and the second linear motor has a primary side mounted to a portion near the movable rail side rolling member circulation passage of the movable rail, so that the thrust force can be generated at substantially the same positions of the movable side rolling member circulation passage and the track rail side rolling member circulation passage, regardless of the stroke of the movable rail. Therefore, even if a pitching or yawing moment is applied to the movable rail, the thrust force can be stably applied to the movable rail.

The first and second linear motors may be composed of linear induction motors or linear pulse motors such that the secondary sides thereof are opposed to each other.

For example, in a case where linear D.C. motors are used, two sets of linear motors are disposed in back-to-back arrangement and a distance between the secondary side magnets is short, an alternating magnetic field may be generated between the magnets. However, according to this embodiment of the present invention, because the linear induction motors or linear pulse motors are used without using the magnets, there is no fear of causing any alternating magnetic filed. However, a linear D.C. motor may be utilized as far as a relatively large distance between the secondary sides of the linear D.C. motors can be taken so as not to influence from each other.

The nature and further characteristic features of the present invention may be made clear from the following descriptions made with reference to the accompanying drawings.

DESCRIPTION OF THE PREFERRED EMBODIMENTS

Figure 1:
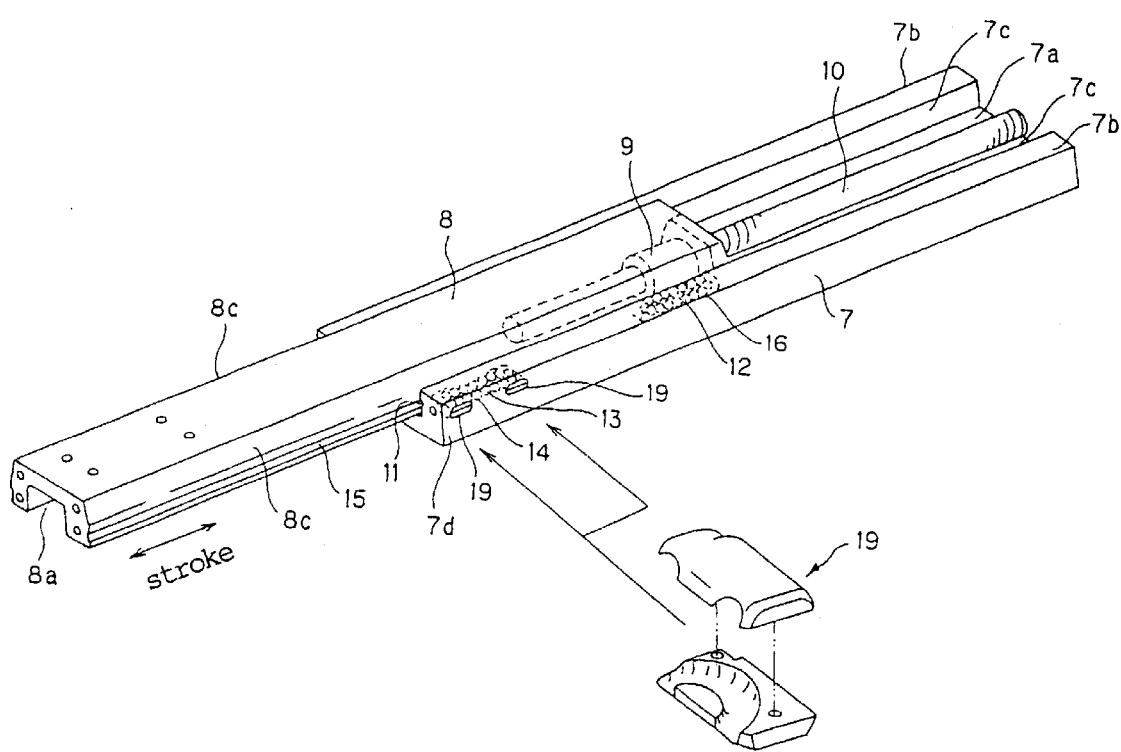
FIG. 1 is a perspective view of a rolling guide device according to one embodiment of the present invention.
Figure 2:
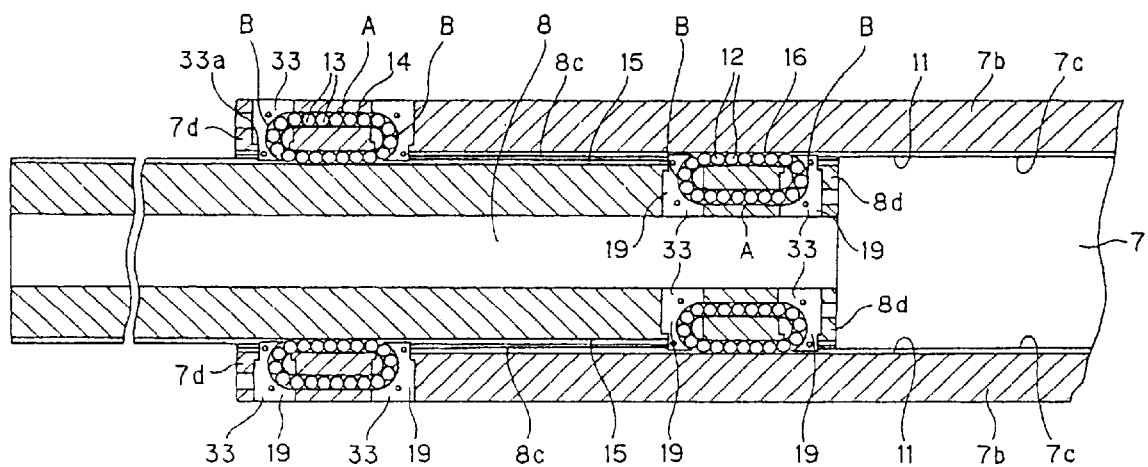
FIG. 2 is a transverse sectional view of the rolling guide device of FIG. 1, partially cut away, in the longitudinal direction thereof.
Figure 3:
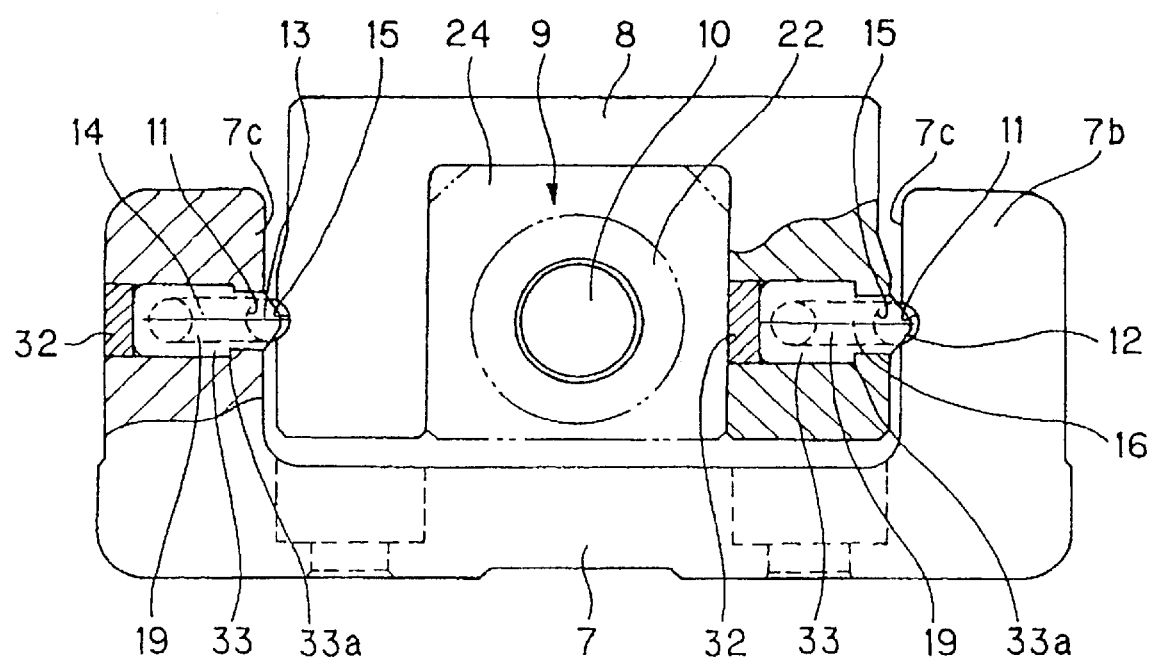
FIG. 3 is a sectional view in a direction normal to the axis of the rolling guide device.

FIGS. 1 to 3 represent a first embodiment of a rolling guide device according to the present invention.

With reference to FIGS. 1 to 3, a rolling guide device comprises an outer rail 7 as a track rail, an inner rail 8, as a movable rail, supported by the outer rail 7 to be slidable in the longitudinal direction thereof and a ball screw 9 driving the inner rail 8. When a screw shaft 10 of the ball screw 9 is rotated, the inner rail 8 slides with respect to the outer rail 7. Such rolling guide device will be utilized for a welding servo-gan, fork-lift or like usable in a stockroom, for example. In a case where the rolling guide device is utilized for the welding servo-gan, a welding rod is attached to the inner rail 8 and, then, the inner rail 8 is slid so as to press the welding rod against an object to be welded. On the other hand, in a case where the rolling guide device is utilized for the fork-lift, an inner rail 8 having a front fork member is slid and the fork-lift is then moved while supporting a cargo by the projected fork member. It is, of course, to be noted that the illustrated rolling guide device is not limited in its use to the welding servo-gan and the fork-lift and can be applied for various usages as far as expansion/contraction stroke is required and a load is supported.

The outer rail 7 has a recess 7a having an upper opening, in an illustrated state, so as to provide substantially a ⊐-shaped (box-shaped) section having an upper opening. That is, the recess 7a is defined by a bottom portion and a lateral pair of ridges 7b, 7b extending in parallel with each other at both longitudinal side portions of the bottom portion. Each of the ridges 7b has an inside surface 7c to which one row of ball rolling groove 11 is formed as a rolling member rolling surface extending in the longitudinal direction thereof. An outer rail side ball circulation passage 14 for circulating balls 13, as rolling members, rolling between the inner rail 8 and the outer rail 7 is formed in one longitudinal side end portion of the outer rail 7.

The inner rail 8 is fitted to the recess 7a of the outer rail 7 and supported thereby through balls 12, 13 so as to be clamped between the ridges 7b, 7b of the outer rail 7. The inner rail 8 has a recess 8a having a lower opening, in an installed state, so as to provide substantially a ⊐-shape section having a lower opening, thus easily forming a space into which the screw shaft 10 is moved.

In the fitted state of the inner and outer rails 8 and 7, the inside surfaces 7c, 7c of the outer rail 7 face the outside surfaces 8c, 8c of the inner rail 8, respectively, so that the ball rolling grooves 11 formed in the inside surfaces 7c, 7c of the outer rail 7 oppose the loaded ball rolling grooves 15 formed in the outside surfaces 8c, 8c of the inner rail 8. Inner rail side ball circulation passages 16 are formed in one longitudinal end side of the inner rail 8 opposing to the outer rail side ball circulation passages 14 so as to circulate the balls 12 rolling between the outer and inner rails 7 and 8. That is, in the structure in which the inner rail 8 projects from (extends over) the outer rail 7, the outer rail side ball circulation passages 14 on the exit side end of the outer rail 7 and the inner rail side ball circulation passages 16 are formed in the rear side end of the inner rail 8. This will be explained through manufacturing processes. The outer rail side ball circulation passages 14 are formed on one end side of the outer rail 7 and the inner rail side ball circulation passages 16 are formed on one end side of the inner rail 8, and thereafter, the inner and outer rails 8 and 7 are assembled (fitted) from the direction in which both the circulation passages 14 and 16 do not interfere.

As shown in FIG. 2, each of the outer rail side ball circulation passages 14 is composed of a portion of the ball rolling groove 11, a ball return passage A as a rolling member return passage substantially parallel to the ball rolling groove 11 and a pair of rolling member rolling direction changing passages B communicating with the ball rolling groove 11 and the ball return passage A. On the other hand, each of the inner rail side ball circulation passages 16 is also composed of a portion of the loaded ball rolling groove 15, a ball return passage A as a rolling member return passage substantially parallel to the ball rolling groove 15 and a pair of rolling member rolling direction changing passages B communicating with the loaded ball rolling groove 15 and the ball return passage A. The ball return passage A is formed through a drilling working effected along the longitudinal direction from the end portions of an outer rail body 7d and an inner rail body 8d. The rolling direction changing passages B formed in the outer and inner ball circulation passages 14 and 16 are formed in deflectors 19 formed independently from the inner and outer rail bodies 8d and 7d. The details of such deflector 19 will be described hereinlater.

The ball screw 9 is engaged with the inner rail 8 so that the ball screw 9 is arranged in the recess 8a of the inner rail 8.

Figure 4:
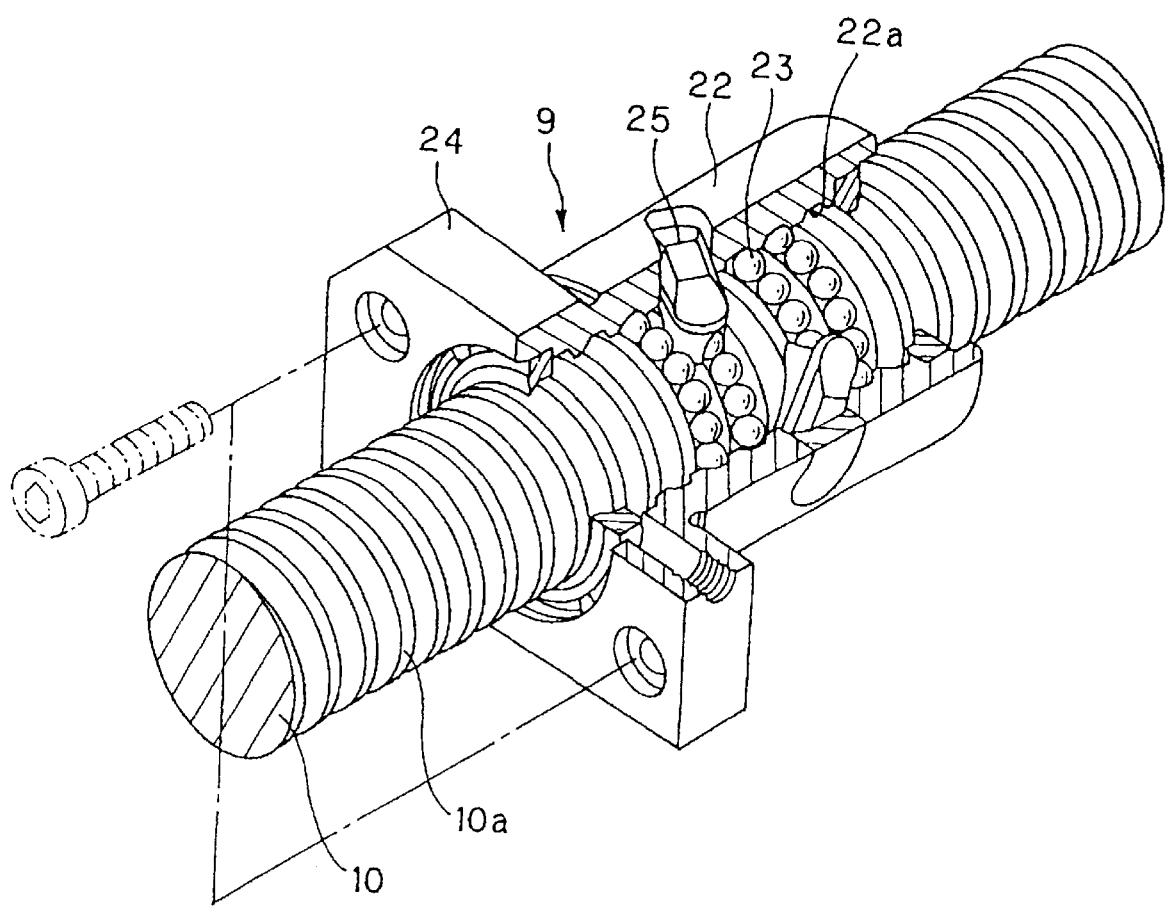
FIG. 4 is a perspective view showing a ball screw to be incorporated in the rolling guide device of FIG. 1.

With reference to FIG. 4 showing the ball screw 9, the ball screw 9 comprises the screw shaft 10, a nut member 22 assembled to the screw shaft 10 to be relatively movable and a number of balls 23 disposed in the ball circulation passage. The screw shaft 10 has an outer peripheral surface on which a spiral rolling member rolling groove 10a is formed, the nut member 22 has an inner peripheral surface to which is formed a ball circulation passage including a spiral loaded rolling member rolling groove 22a opposing to the ball rolling groove, and the number of balls 23 are arranged in the ball circulation passage so as to circulate therein in association with the relative movement of the nut member 22 with respect to the screw shaft 10. The nut member 22 has a flanged portion 24 formed at its one end side and is secured to the inner rail 8 by means of screws or like. The nut member 22 is also provided with a deflector 25 (direction changing passage forming member) for taking out the ball 23 rolling along the ball rolling groove 10a formed to the screw shaft 10 at one portion thereof and returning the ball 23 to the other portion (one-lead on this side from the ball taken out portion) of the ball rolling groove 10a over an outer large diameter portion of the screw shaft 10. The screw shaft 10 is operatively coupled with an output (drive) shaft of a motor, mentioned hereinafter.

When the screw shaft 10 is rotated, the ball 23 rolling in the circumferential direction of the screw shaft under load is scooped up by the deflector 25 and the scooped ball 23 is then returned to the position, one-lead on this side of the ball rolling groove 10a. When the screw shaft 10 is rotated in the reverse direction, the balls 23 are circulated along the route reverse to that mentioned above. Further, in the described embodiment, although the balls 23 are scooped up by using the direction changing passage forming member (deflector) 25 and returned to the position, one-lead on this side of the ball rolling groove 10a, a return pipe may be substituted for such deflector 25. That is, according to the structure using the return pipe, the ball 23 rolling along the ball rolling groove 10a of the screw shaft 10 is scooped up by one end of the return pipe and is then returned through the other one end thereof. Furthermore, a so-called side-cover (lid) type ball screw may be adapted, in which the nut member 22 is composed of a nut body formed with a loaded rolling groove and side lids applied to both ends of this nut body, a ball return passage is formed to the nut body, and both the side lids are formed with communication passages communicated with the loaded rolling groove and the return passage, respectively. An arrangement utilizing rollers in place of balls may be also applicable to the present invention.

Figure 5:
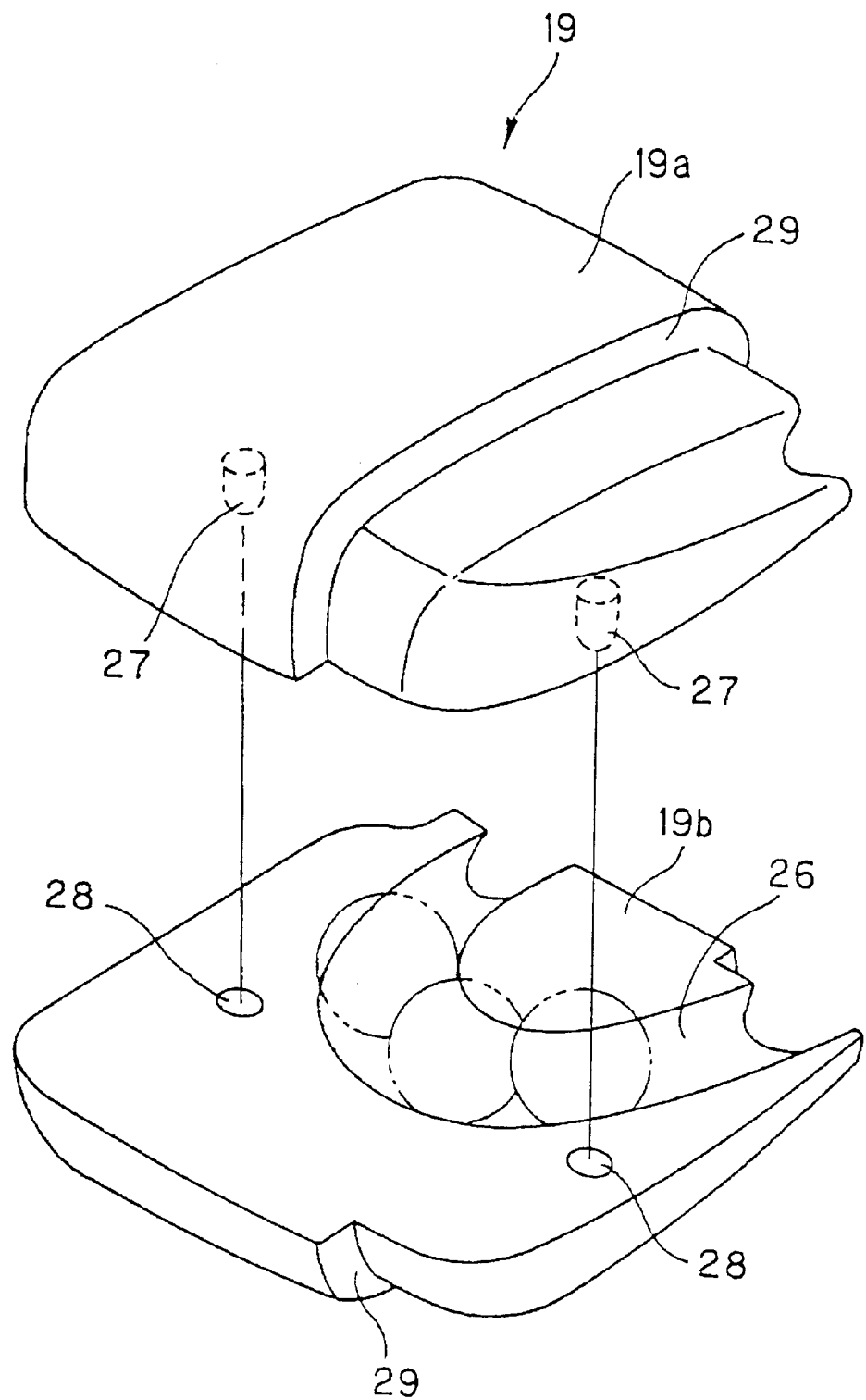
FIG. 5 is a perspective view showing one example of a deflector to be assembled with the rolling guide device.

FIG. 5 shows the details of the deflector 19, which is utilized commonly for the inner rail side ball circulation passage 16 and the outer rail side ball circulation passage 14. With reference to the deflector 19 of FIG. 5, the deflector 19 is formed with rolling direction changing passage 26 in a semi-circular shape, and the deflector is composed of two bodies 19a and 19b divided along the rolling direction changing passage 26 for the sake of easy formation of this passage 26. That is, these two body sections 19a and 19b are divided vertically, as viewed through a plane including a central line of the rolling direction changing passage 26. Both the body sections 19a and 19b are positioned through the engagement of dowels 27 and holes 28 formed to the body sections 19a and 19b. The deflector 19 is further formed with a stepped abutment portion 29 for the purpose of positioning it on the inner rail side ball circulation passage 16 and the outer rail side ball circulation passage 14. The deflector 19 of the structure mentioned above will be formed from synthetic resin, for example, through an injection formation process.

Figure 6:
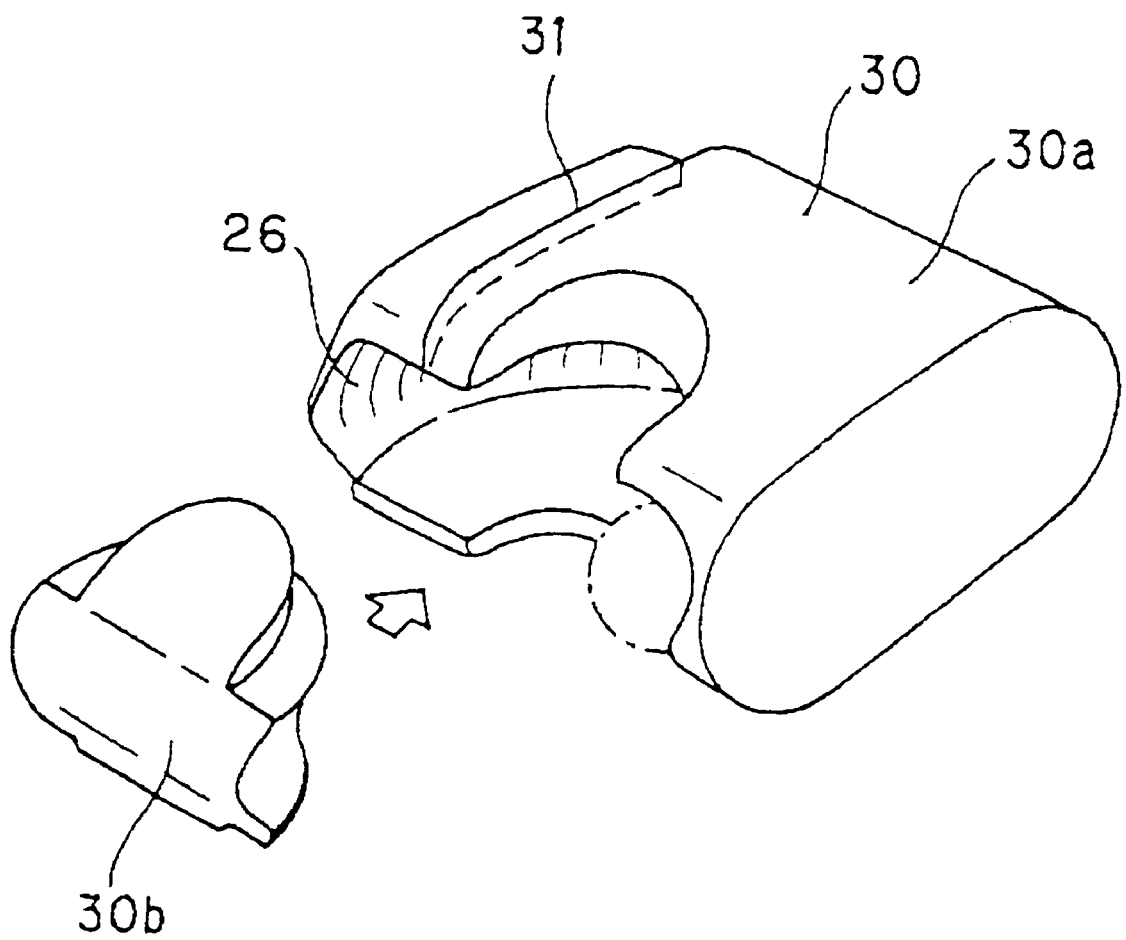
FIG. 6 is a perspective view showing another example of the deflector.

FIG. 6 shows another example of the deflector 30. This deflector 30 is also composed of two divided body sections 30a and 30b separated along the rolling direction changing passage 26 for the easy formation thereof as mentioned before. In this example, however, the rolling direction changing passage 26 is divided into two sections as inner peripheral side section and outer peripheral side section. This deflector 30 is also formed with a stepped abutment portion 31.

With reference to FIGS. 2 and 3, the outer rail body 7d is drilled from the side thereof to form holes 33 by means of end milling, for example, and the deflectors 19 are fitted to these holes 33. The fitted deflectors 19 is secured to the outer rail body 7d by fastening means 32 such as binder members. The holes 33 are formed so as to penetrate the ball return passages A and extend ball rolling grooves 11 or ball rolling grooves 15 and formed inside with stepped portions 33a abutting against the abutment portions 29 of the deflectors 19. When fitting the deflector 19, the outer periphery of the deflector 19 is fitted to the hole 33 and the abutment portion 29 of the deflector 19 abuts against the stepped portion 33a of the hole 33, thus positioning the deflector 19 with respect to the outer rail body 7d or inner rail body 8d.

Through such positioning of the deflector 19, the balls 12 and 13 can be surely scooped from the ball rolling groove 11 or loaded ball rolling groove 15 and then returned to the ball return passage A.

On the other hand, other holes 33 are formed to the inner rail body 8d from the side thereof by means of end mill, for example, and the deflectors 19 are fitted to these holes 33. Furthermore, in the described embodiment, although the holes 33 are formed to the outer rail body 7d from the outside thereof and formed to the inner rail body 8d from the inside thereof, the holes 33 may be formed to the outer rail body 7d from the inside thereof and formed to the inner rail body 8d from the outside thereof.

Figure 7:
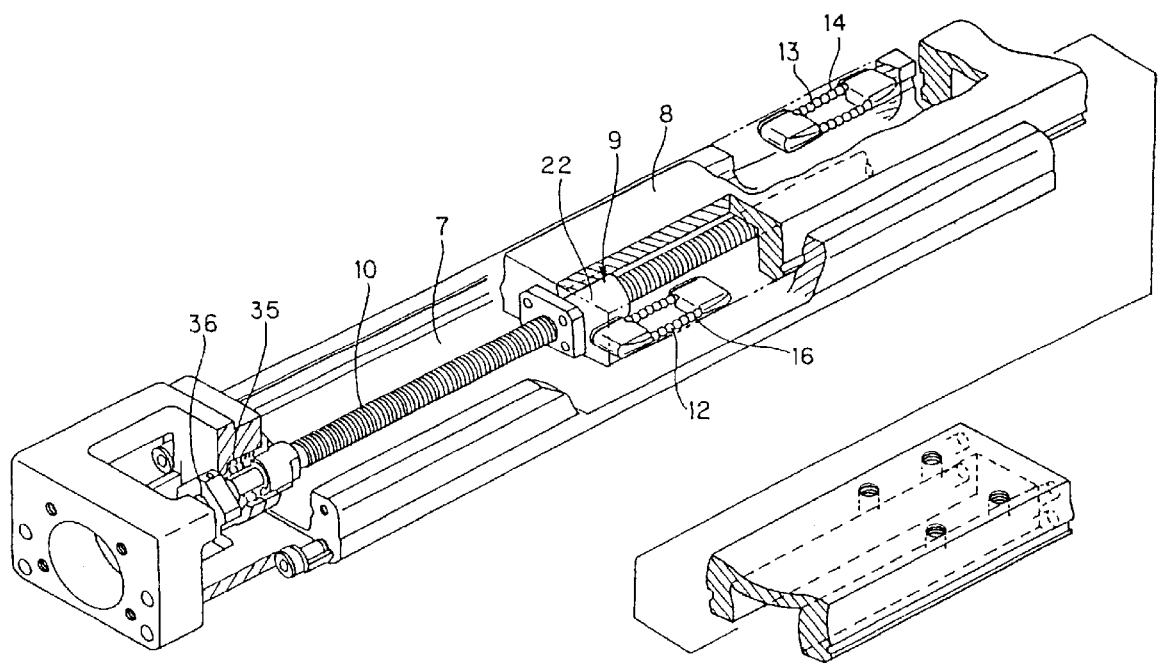
FIG. 7 is a perspective view of a drive system using the rolling guide device of FIG. 1.

FIG. 7 shows one preferred example of a drive system according to the present invention, which uses the rolling guide device mentioned above and is assembled with a rotation motor.

The screw shaft 10 is screwed with the nut member 22 and has one end rotatably supported by a bearing 35 disposed at one end portion of the outer rail 7 and coupled to a motor, not shown, through a joint member 36. According to this structure, when the motor is driven, the screw shaft 10 is rotated and the rotational motion thereof is transferred to the inner rail 8 through the ball screw to thereby linearly move the inner rail 8 along the outer rail 7. According to this linear motion of the inner rail 8 along the outer rail 7, the rolling guide device is expanded or contracted, and the balls 12 and 13 circulate in an endless manner in the inner rail side ball circulation passage 16 and the outer rail side ball circulation passage 14 while rolling therealong. Because the balls 12 and 13 endlessly circulate, even if the balls 12 and 13 slide during the rolling motion, there is no fear of being shifted from the original position as in a conventional slide rail, and a rolling guide device having a large expansion stroke can be realized, in which the inner rail 8 can be smoothly moved.

Figure 8:
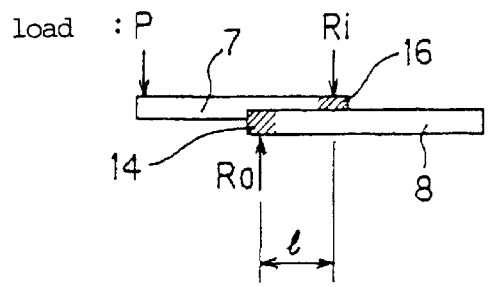
FIG. 8 is an illustration showing a state that a load is applied to a front end portion of the rolling guide device of FIG. 1.

FIG. 8 is an illustration showing a state that a load P is applied to the front end of the inner rail 8 of the rolling guide device. In an optional expanded or contracted state, because a considerable distance 1 exists between the outer rail side ball circulation passage 14 and the inner rail side ball circulation passage 16, there can be provided a rolling guide device bearing the moment load. For example, when the load P is applied to the front end portion of the inner rail 8, a reaction force Ro acts on the outer rail side ball circulation passage 14 and a reaction force Ri acts on the inner rail side ball circulation passage 16, thus bearing the moment load of (Ri×1). When the inner rail 8 slides and the stroke of the rolling guide device is made large, the above-mentioned distance 1 is gradually reduced and an ability for loading this moment load is also reduced. However, even if the inner rail 8 slides, the inner rail 8 never comers off as in the conventional slide rail from the balls, so that the moment load bearing ability cannot be reduced significantly. Furthermore, the movable rail does not come off from the ball as in the conventional slide rail and the number of balls born in the optional expanded or contracted attitude does not change, so that a rolling guide device capable of bearing constant radial load and thrust load can be realized.

Furthermore, as mentioned above, the outer rail 7 has a recess 7a having an upper opened portion has a box-shaped section and the ball rolling grooves 11 are formed in the inside surfaces 7c, respectively. The inner rail 8 is fitted into the recess 7a of the outer rail 7 and the loaded ball rolling grooves 15 are formed in the outside surfaces 8c of the inner rail 8 so as to oppose the inside surfaces 7c of the outer rail 7. Accordingly, there is provided the rolling guide device capable of bearing the radial load, the thrust load and the moment load in a balanced condition.

Figure 9A:
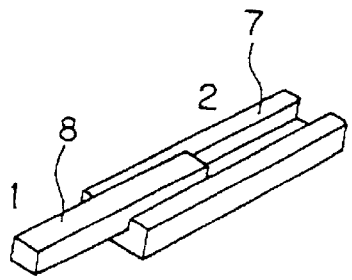
FIG. 9 is an illustration of a further embodiment of the rolling guide device and includes FIG. 9A showing a two-stage type rolling guide device and FIG. 9B showing a three-stage type rolling guide device.
Figure 9B:
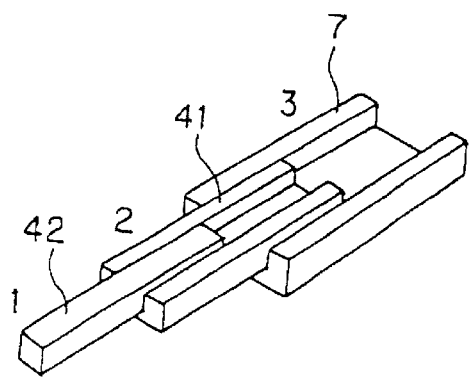

FIG. 9 includes perspective views of the rolling guide device according to another embodiment of the present invention. Referring to FIG. 9A, the device is provided with inner and outer rails 8 and 7, constituting a single-stroke structure in which only the inner rail 8 slides. Further, as shown in FIG. 9B, the rolling guide device may be composed of three rail sections comprising the outer rail 7, a first inner rail 41 fitted to the outer rail 7 and a second inner rail 42 fitted to the first inner rail 41. In this structure, the first inner rail 41 slides with respect to the outer rail 8 and the second inner rail 42 slides with respect to the first inner rail 41. That is, the first inner rail 41 acts like the inner rail 8 of the aforementioned embodiment with respect to the outer rail 7 and also acts like the outer rail 7 of the aforementioned embodiment with respect to the second inner rail 42. The second inner rail 42 has a structure identical to that of the inner rail 8. According to this rolling guide device of the embodiment of FIG. 9B, since the first inner rail 41 slides with double strokes, the expansion stroke can be made longer. As mentioned above, when the rolling guide device is composed of a plurality of members (rail members), the expansion stroke composed of a plurality of expansion stages can be realized, thus providing a rolling guide device having a large stroke.

In the embodiment described above, although the inner rail side ball circulation passage 16 and the outer rail side ball circulation passage 14 are formed in the inner rail 8 and the outer rail 7, respectively, these passages may be formed as block members independently from the inner and outer rails 8 and 7. Furthermore, although the inner rail 8 and the outer rail 7 are formed as linear (straight) rail members, a curved rail member may be utilized therefor. The balls may be also substituted with other rolling members such as rollers. Retainers each having a belt shape having flexibility may be arranged for supporting the balls 12 and 13 to be rotatable, and spacers may be also arranged between the balls 12 and 13 for supporting them to be rotatable and slidable.

Figure 10:
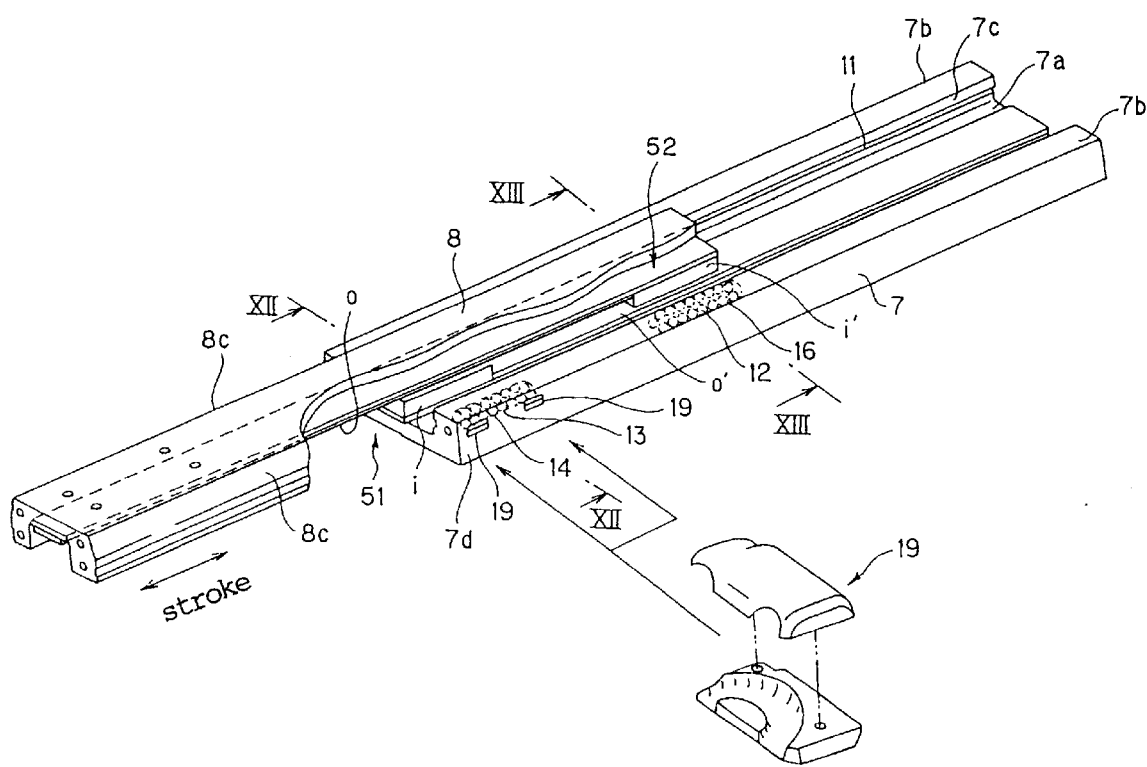
FIG. 10 is a perspective view of a drive system, according to another embodiment of the present invention, incorporated with a liner motor.
Figure 11:
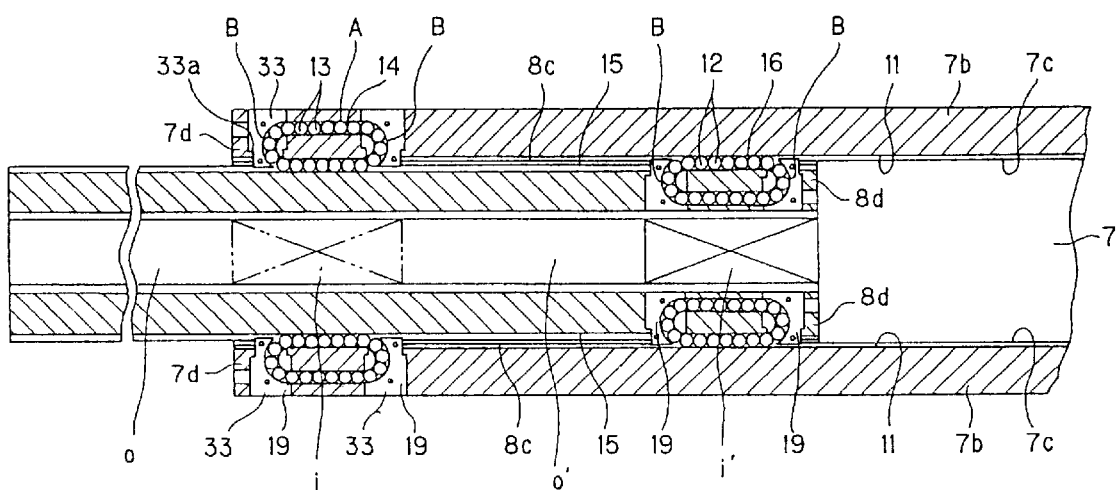
FIG. 11 is a transverse sectional view of the drive system of FIG. 10, partially cut away, in the longitudinal direction thereof.

FIGS. 10 and 11 represent a drive system, using a linear motor as drive source, according to one embodiment of the present invention.

This drive system comprises an outer rail 7 as a track rail, an inner rail 8 as a movable rail supported by the outer rail 8 to be linearly slidable along the longitudinal direction thereof and first and second linear motors 51 and 52 disposed between the inner and outer rails 8 and 7 to be back-to-back arrangement. The outer rail 7 is provided with a primary side movable piece (called merely movable piece i hereinlater) of the first linear motor 51 and a secondary side stationary piece (called merely stationary piece O' hereinlater) of the second linear motor 52. On the other hand, the inner rail 8 is provided with a secondary side movable piece (called merely movable piece i' hereinlater) of the second linear motor 52 and a primary side stationary piece (called merely stationary piece O hereinlater) of the first linear motor 51. According to this structure, when energized, suction (attracting) forces are induced between the movable piece i and the stationary piece O and between the movable piece i' and the stationary piece O'.

Like the rolling guide device mentioned above, the outer rail 7 is formed with a recess 7a having a box-shaped section with an upper opening and also formed with a lateral pair of ridges 7b, 7b extending on both the sides of the recess 7a in parallel with each other along the longitudinal direction of the outer rail 7. Each of the ridges 7b, 7b has an inside surfaces 7c, to which a single row of ball rolling grooves 11 as a rolling member rolling surface is formed so as to extend along the longitudinal direction thereof as shown in FIG. 11. An outer rail side ball circulation passage 14 for circulating the balls 13 rolling between the inner and outer rails 8 and 7 is formed in one (front) end side portion of the outer rail 7.

The inner rail 8 is fitted to the recess 7a of the outer rail 7 and supported thereby so as to be clamped between the ridges 7b of the outer rail 7 through the balls 12 and 13. The inner rail 8 is also formed with a recess 8a having an opening opened downward so as to provide a box-shaped section. The inner rail 7 has outside surfaces 8c to which loaded ball rolling grooves 15 are formed as loaded rolling member rolling surfaces which face the ball rolling grooves 11 of the outer rail 7. An inner rail side ball circulation passage 16 for circulating the balls 12 rolling between the inner and outer rails 8 and 7 is formed in one (rear) end side portion of the outer rail 7 in the longitudinal direction thereof.

As shown in FIG. 11, the outer rail side ball circulation passage 14 is composed of a portion of the ball rolling groove 11, a ball return passage A as a rolling member return passage extending substantially in parallel with the ball rolling groove 11 and a pair of rolling direction changing passages B communicated with the ball rolling groove 11 and the ball return passage A. On the other hand, the inner rail side ball circulation passage 16 is also composed of a portion of the loaded ball rolling groove 15, a ball return passage A as a rolling member return passage extending substantially in parallel with the loaded ball rolling groove 15 and a pair of rolling direction changing passages B communicated with the loaded ball rolling groove 15 and the ball return passage A. The ball return passages A are formed through drilling work effected from the end portions of the outer rail body 7d and the inner rail body 8d in their longitudinal directions. The rolling direction changing passages B of the outer rail side ball circulation passage 14 and the inner rail side ball circulation passage 16 are formed in a deflector 19 which is mounted to the inner rail body 8d and the outer rail body 7d as an independent member.

Holes 33 are formed to the outer rail body 7d by means of end milling, for example, from the longitudinal sides thereof, and the deflector 19 is fitted to these holes 33 and then fastened to the outer rail body 7d. Holes 33 are also formed to the inner rail body 8d by means of end mill, for example, from the longitudinal sides thereof, and the deflector 19 is fitted to these holes 33 and then fastened to the inner rail body 8d. Because these deflectors have substantially the same structures as that mentioned herein before with reference to the rolling guide device, the details thereof are omitted herein by adding the same reference numeral of 19.

Two linear motors 51 and 52 are interposed between the inner rail 8 and the other rail 7, and the linear motors 51 and 52 in this embodiment are linear induction motors and composed of the movable pieces i and i' and the stationary pieces O and O', the induction motors being driven and operated by passing polyphase alternating current to primary windings of the movable pieces i and i'.

With reference to FIG. 10, the movable piece i of the first linear motor 51 is mounted to a portion near one end (front end) in the longitudinal direction of the upper surface of the outer rail 7, and the stationary piece O' of the second linear motor 52 is also mounted to the upper surface of the outer rail 7 so as to be continuous to the movable piece i of the first linear motor 51 in the longitudinal direction of the outer rail 7. On the other hand, the movable piece i' of the second linear motor 52 is mounted to a portion near one end (rear end) in the longitudinal direction of the lower surface of the inner rail 8, and the stationary piece O of the first linear motor 51 is also mounted to the lower surface of the inner rail 8 so as to be continuous to the movable piece i' of the second linear motor 52 in the longitudinal direction of the inner rail 8. In such arrangement, the movable piece i of the first linear motor 51 and the outer rail side ball circulation passage 14 have substantially the same positions in the longitudinal direction of the outer rail 7, and on the other hand, the movable piece i' of the second linear motor 52 and the inner rail side ball circulation passage 16 have substantially the same positions in the longitudinal direction of the inner rail 8. Further, it is to be noted that the terms "upper", "lower" and the like are used herein in the illustrated state in the figures or usable state of the device or system.

Figure 12:
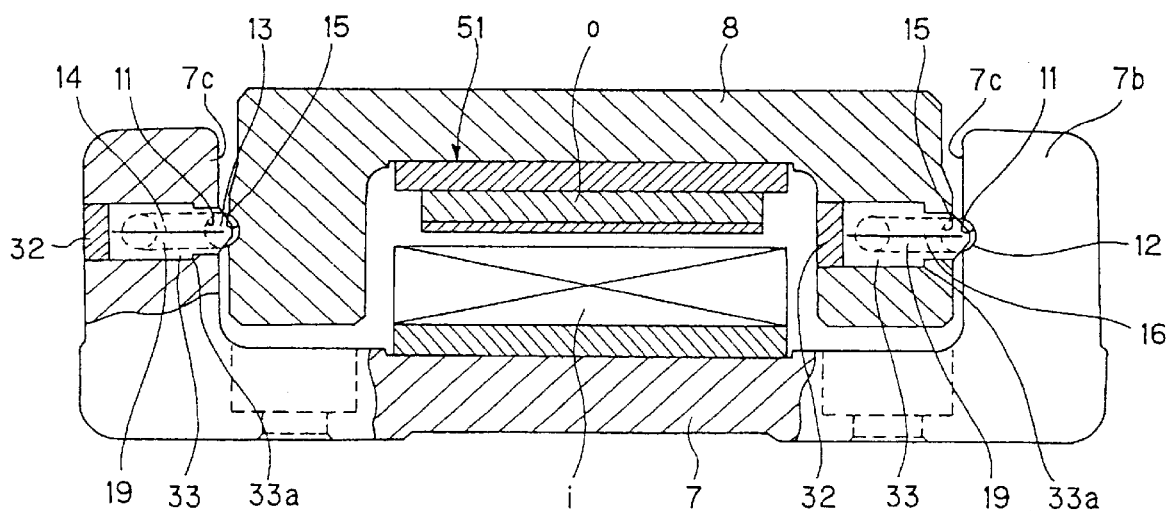
FIG. 12 is a sectional view taken along the line XII—XII in FIG. 10.
Figure 13:
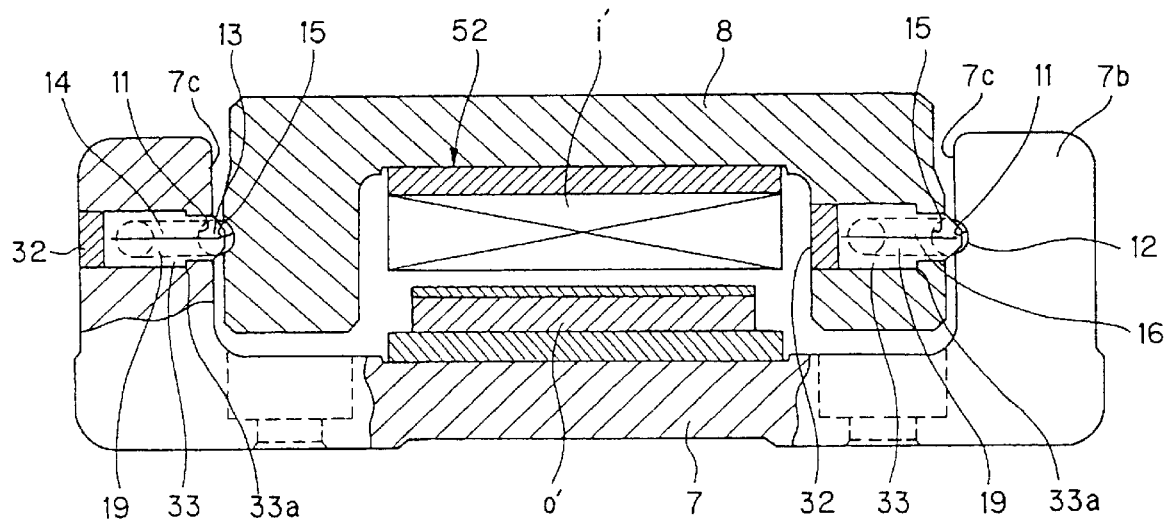
FIG. 13 is a sectional view taken along the line XIII—XIII in FIG. 10.
Figure 14:
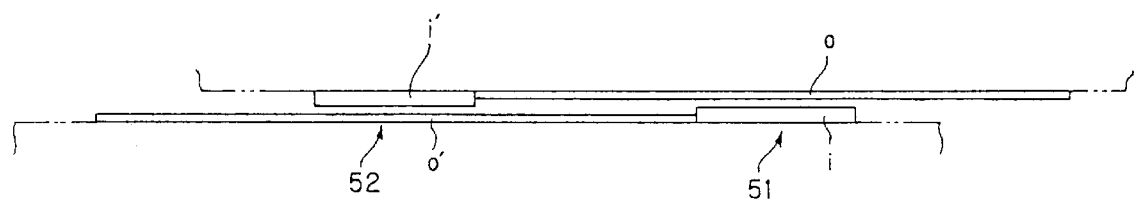
FIG. 14 is an illustration showing an example in which two set of linear motors are disposed in back-to-back arrangement.

As shown in FIG. 12, the movable piece i of the first linear motor 51 is opposed to the stationary piece O of the first linear motor 51, and as shown in FIG. 13, the movable piece i' of the second linear motor 52 is opposed to the stationary piece O' of the second linear motor 52 so that the first and second linear motors 51 and 52 are disposed in the back-to-back arrangement as shown in FIG. 14.

Figure 15:
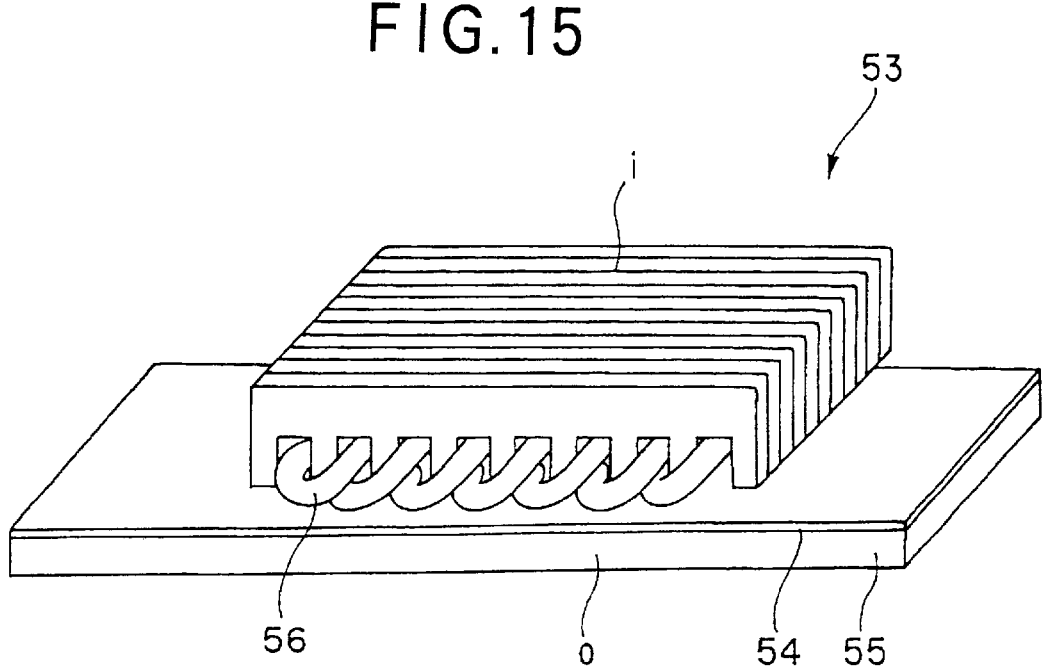
FIG. 15 is a perspective view showing a linear induction motor.

FIG. 15 shows a linear induction motor 53 constituting one example of the first and second linear motors 51 and 52. The linear induction motor 53 is provided with the movable piece i and the stationary piece O which is composed of a non-magnetic conductor plate 54 and a magnetic conductor plate 55 by laminating them vertically as viewed. This linear induction motor 53 is driven in a manner basically identical to that of a cage (rotary type) induction motor having an operational function explained by the Lenz's law and the Fleming's left-hand rule.

When the polyphase alternating current passes the polyphase primary winding 56, a traveling (progressive) magnetic field moving timely and spacially is generated, and this traveling field induces an eddy current on the non-magnetic conductor plate 54 constituting the secondary side element. The thus generated eddy current constitutes a thrust generation source in cooperation with the traveling field. Further, in the illustrated example of FIG. 15, the movable piece i is disposed only on the upper portion of the stationary piece O, but the movable pieces i may be disposed on both the upper and lower portions thereof.

Figure 16:
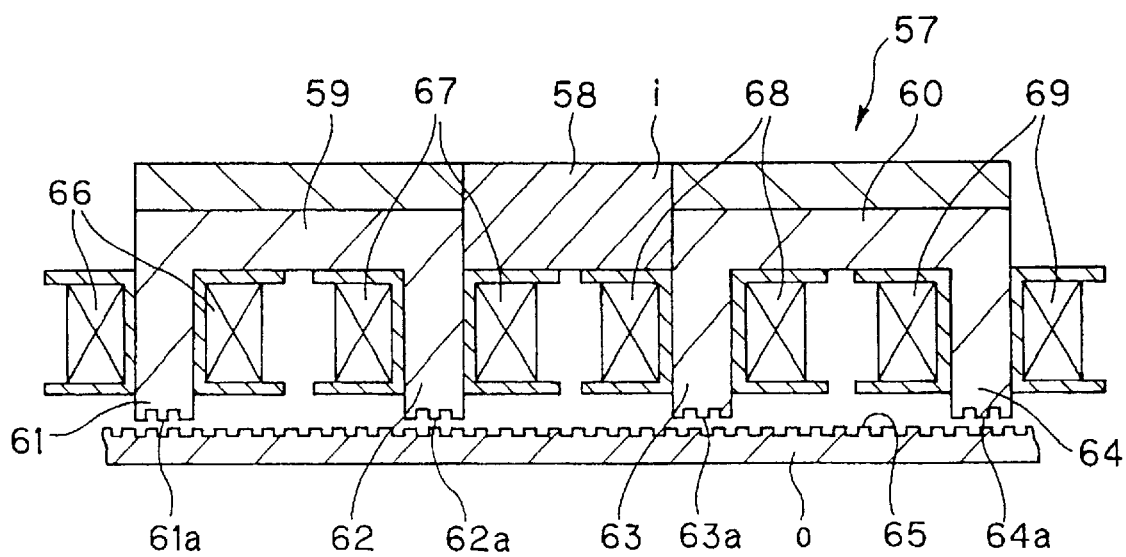
FIG. 16 is a vertical sectional view of a liner pulse motor in a longitudinal direction thereof.

FIG. 16 shows a linear pulse motor 57 as another example of the linear motor 51 (52).

With reference to FIG. 16, the movable piece i is, for example, composed of a central permanent magnet 58 and two magnetic core members 59 and 60 opposed to each other with the permanent magnet 58 being interposed therebetween. One 59 of the magnetic cores is formed with first and second magnetic poles 61 and 62 magnetized in N-pole by the permanent magnet 58 and, on the contrary, the other one 60 of the magnetic cores is formed with third and fourth magnetic poles 63 and 64 magnetized in S-pole by the permanent magnet 58.

On the other hand, the stationary piece O is formed with stationary teeth 65, each having, a ⊐-shaped section, extending in a direction normal to the longitudinal direction of the stationary piece O equally with the same pitch. The magnetic poles 61 to 64 are formed with magnetic pole teeth 61a to 64a, respectively, each having the same pitch as that of the stationary piece O.

A first coil 66 and a second coil 67 are wound up around the first magnetic pole 61 and the second magnetic pole 62 of the N-pole side and connected in series to each other so as to generate magnetic fluxes opposed to each other in directions at a time when current flows. The first coil 66 and the second coil 67 are electrically connected to a pulse generation source, not shown.

On the other hand, a third coil 68 and a fourth coil 69 are also wound up around the third magnetic pole 63 and the fourth magnetic pole 64 of the S-pole side and connected to a pulse generation source.

In the described arrangement, the first and second magnetic poles 61 and 62 are arranged so that the magnetic pole teeth 61a and 62a thereof are shifted from each other by ½ pitch in their phases, and the third and fourth magnetic poles 63 and 64 are also arranged so that the magnetic pole teeth 63a and 64a thereof are shifted from each other by ½ pitch in their phases. Furthermore, the magnetic pole teeth 63a and 64a of the third and fourth magnetic poles 63 and 64 of the S-pole side are shifted, by ¼ pitch in phases, from the first and second magnetic pole teeth 61a and 62a of the first and second magnetic poles 61 and 62 of the N-pole side.

The linear pulse motor is driven by the following operation theory with reference to FIGS. 17A to 17D.

Pulses are inputted to the first and second coils 66 and 67 from terminals a, and pulses are also inputted to the third and fourth coils 68 and 69 from terminals b. That is, the pulses are inputted to the terminal a in a direction to energize the first magnetic pole 61 in the state shown in FIG. 17A, to the terminal b in a direction to energize the fourth magnetic pole 64 in the state shown in FIG. 17B, to the terminal a in a direction to energize the second magnetic pole 62 in the state shown in FIG. 17C, and to the terminal b in a direction to energize the third magnetic pole 63 in the state shown in FIG. 17D, respectively.

Figure 17A:
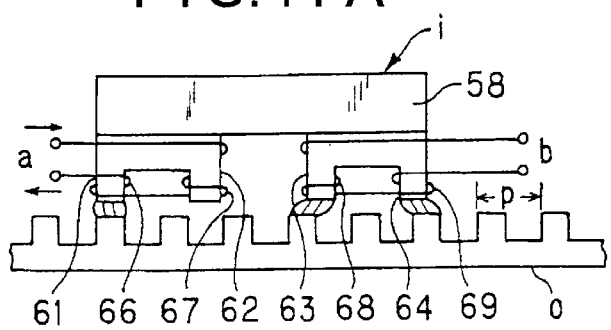
FIGS. 17A to 17D show operation principle of the liner pulse motor.
Figure 17B:
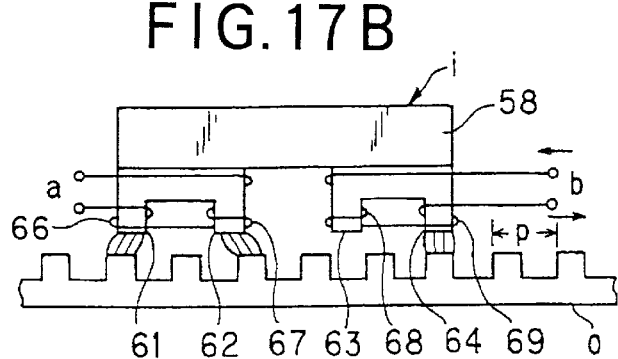
Figure 17C:
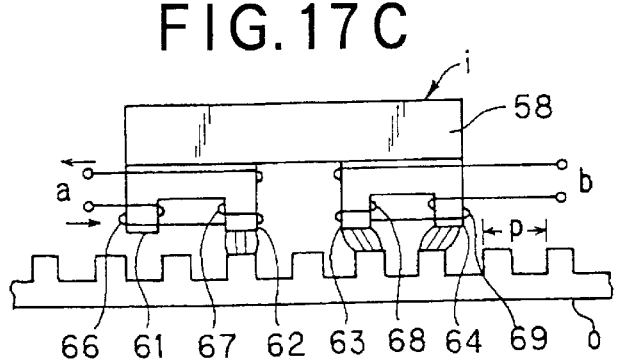
Figure 17D:
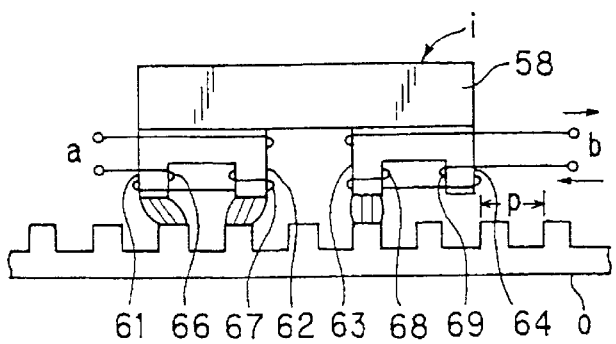

When the pulse is inputted to the terminal a in a direction to energize the first magnetic pole 61 in the state shown in FIG. 17A, the first magnetic pole 61 maintains its stable state under the application of the magnetic fluxes of the permanent magnet 58 and the first coil 66. Next, in the state shown in FIG. 17B, when the pulse is inputted to the terminal b in a direction to energize the fourth magnetic pole 64, the fourth magnetic pole 64 is moved to a direction so as to maintain its stable state, that is, in the right direction facing the drawing paper by ¼ pitch. As mentioned above, the movable piece is operated continuously as shown in FIGS. 17C and 17D by passing alternately the pulse current.

Figure 18:
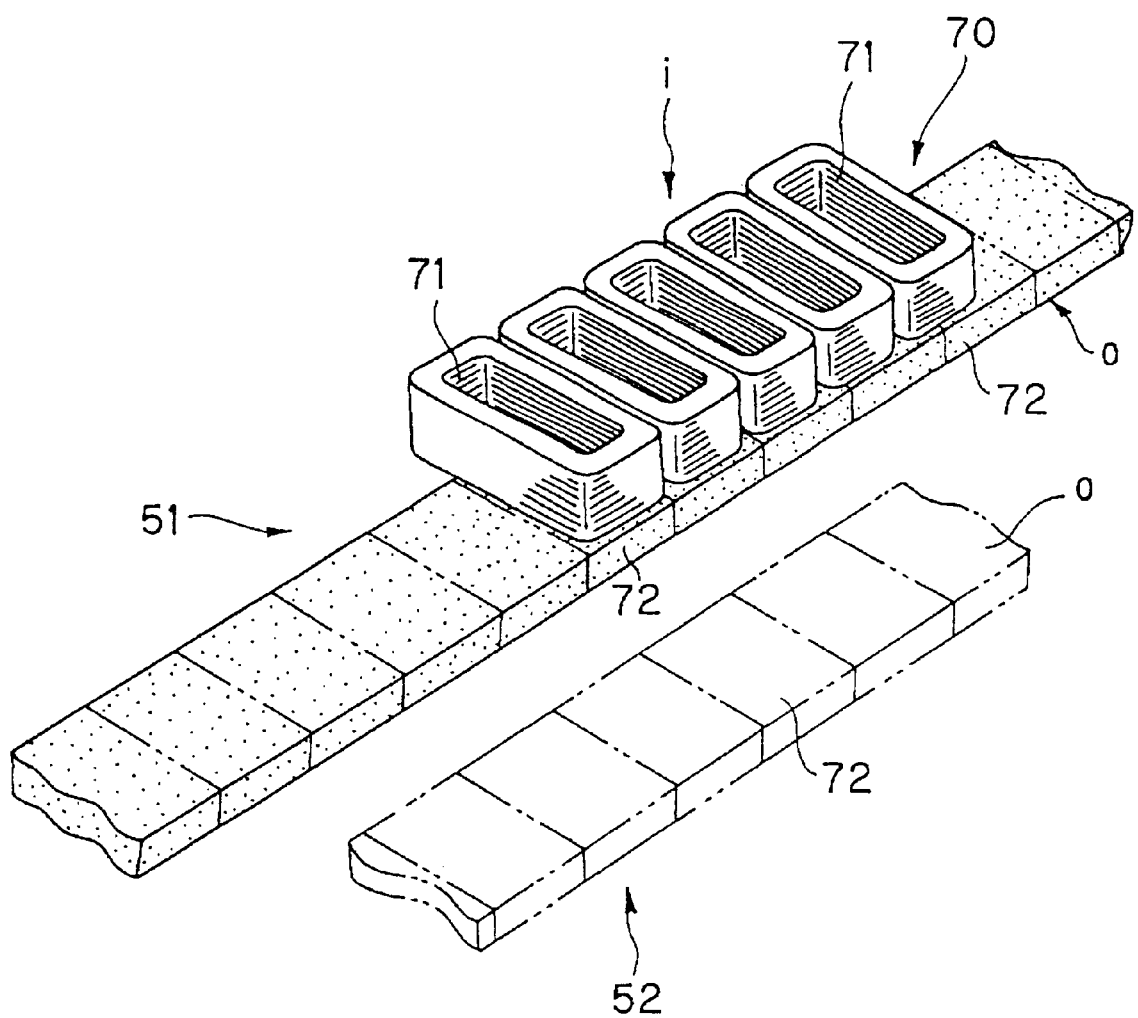
FIG. 18 is a perspective view of a linear D.C. motor.

FIG. 18 represents a linear D.C. motor 70 as another example of the linear motor.

With reference to FIG. 18, a movable piece of this example is composed of exciting coils 71 and yokes, and a stationary piece O is composed of magnets 72 and yokes. A plurality of exciting coils 71 constituting the movable piece i are arranged along the longitudinal direction thereof, and a plurality of magnets 72 constituting the stationary piece O are arranged along the longitudinal direction so as to provide alternately N- and S-poles.

The position of the movable piece i is detected by a sensor, and the direction of the current passing the exciting coil 71 at the detected position is changed sequentially reversely. The exciting coil 71 generates a thrust force in accordance with the Fleming's left-hand rule through the relative reaction between the exciting coils 71 and the magnets 72.

In the case where such a linear D.C. motor is utilized, two sets of linear motors 51 and 52 are disposed in a back-to-back arrangement, and in an arrangement where a distance between the adjacent secondary side magnets 72, 72 is short, there is a fear that an alternating magnetic field is caused between the magnets 72 and 72, which may cause a defective operation. Accordingly, in the case where two sets of the linear, motors 51 and 52 are used in the back-to-back arrangement, the linear induction motor 53 and the linear pulse motor 57, which do not utilize the secondary side magnets 72, could be effectively utilized. However, in an arrangement in which a relatively large distance could be maintained on the secondary side, no adverse effect is not caused between the magnets 72 and 72, so that the linear D.C. motor 70 may be utilized.

The drive system incorporated with the linear motors 51 and 52 of the structures mentioned above will operate in the following manner.

When the current is applied to the movable pieces i and i' of the first and second linear motors 51 and 52, suction (attracting) force acts between the movable pieces i and i' and the stationary pieces O and O' to thereby move the inner rail 8 with respect to the outer rail 7 by a predetermined distance in the longitudinal direction thereof. In this case, the movable piece i of the first linear motor 51 moves forward with respect to the stationary piece O. However, with the second linear motor 52, a current is applied to the movable piece i in a backward movement direction with respect to the stationary piece O because of the movement of the stationary piece O', and as a reaction motion thereto, the stationary piece O' is moved forward. Hence, the inner rail 8 slides with respect to the outer rail 7, and therefore, the entire structure of the drive system is expanded and contracted.

In the structure utilizing the linear motors 51 and 52 as a driving source, it is not necessary to utilize a ball screw or like, and hence, the inner rail can be moved at high speed with less noise. Furthermore, there is no need for locating a space for a rotary motor or like, thus making the drive system thin and compact in its structure. Still furthermore, because the two sets of linear motors 51 and 52 are arranged between the inner rail 8 and the outer rail 7, two times of the thrust force is obtainable and the excitation of the linear motors 51 and 52 is averaged, thus making smooth the movement of the inner rail 7.

Still furthermore, the movable piece i of the first linear motor 51 is mounted to a portion near the outer rail side rolling member circulation passage 14 and the movable piece i' of the second linear motor 52 is mounted to a portion near the inner rail side rolling member circulation passage 16, the points on which the thrust force is applied are always positioned at portions near the outer rail side rolling member circulation passage 14 and the inner rail side rolling member circulation passage 16, irrespective of the stroke of the inner rail 8. The inner rail 8 is supported by the outer rail 7 at the positions of the inner rail side rolling member circulation passage 16 and the outer rail side rolling member circulation passage 14. Accordingly, even if a moment causing pitching or yawing acts on the inner rail 8, the thrust force can be stably generated for the inner rail 8.

Figure 19:
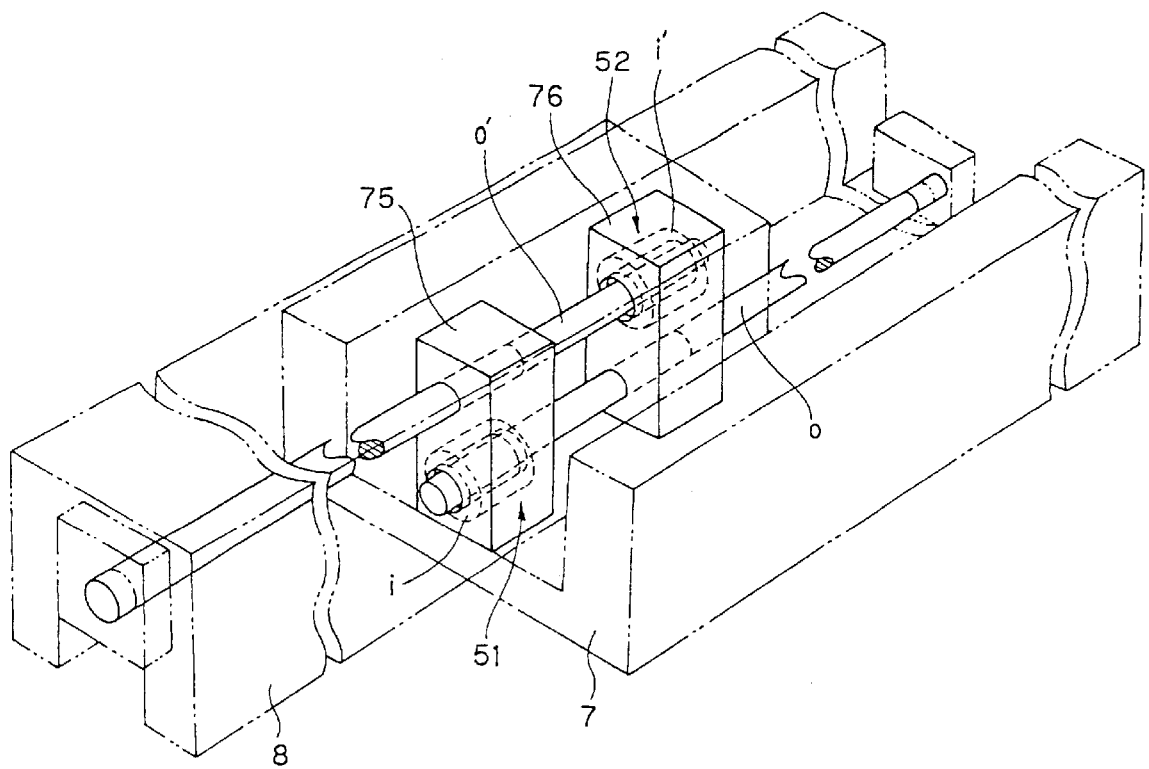
FIG. 19 is a perspective view showing a drive system according to a further embodiment of the present invention.

FIG. 19 represents a drive system according to a further embodiment of thee present invention. The drive system of this embodiment is incorporated with two sets of rod-type linear motors as first and second linear motors 51 and 52. This drive system is also composed of, like the drive system mentioned hereinbefore, an outer rail 7, an inner rail 8 supported by the outer rail 7 to be slidable in the longitudinal direction thereof and first and second linear motors 51 and 52 disposed between the outer rail 7 and the inner rail 8 both having box-shaped sections so that the inner rail 8 is fitted into the outer rail 8. First and second rod-type linear motors are composed of rods O and O' as stationary pieces and cylindrical coils i and i' as movable pieces.

The cylindrical coil i of the first rod-type linear motor 51 is mounted to the front end portion of the outer rail 7 and, to this front end portion, is also mounted an outer rail side bearer 75 supporting the rod O' of the second rod-type linear motor to be slidable in an axial direction thereof. On the other hand, the cylindrical coil i of the second rod-type linear motor 52 is mounted to the rear end portion of the inner rail 8 and, to this rear end portion, is also mounted an inner rail side bearer 76 supporting the rod O of the first rod-type linear motor to be slidable in an axial direction thereof. The operation theory due to this arrangement is substantially the same as that of the drive system of the embodiment mentioned hereinbefore, and by operating the first and second rod-type linear motors 51 and 52, the distance between the outer rail side bearer 75 and the inner rail side bearer 76 are expanded or contracted, thus the inner rail 8 being slid with respect to the outer rail 7. As mentioned above, the rod-type linear motors are also usable as linear motors for the drive system of the present invention.

Description will be come back to the rolling guide device hereunder.

Figure 20:
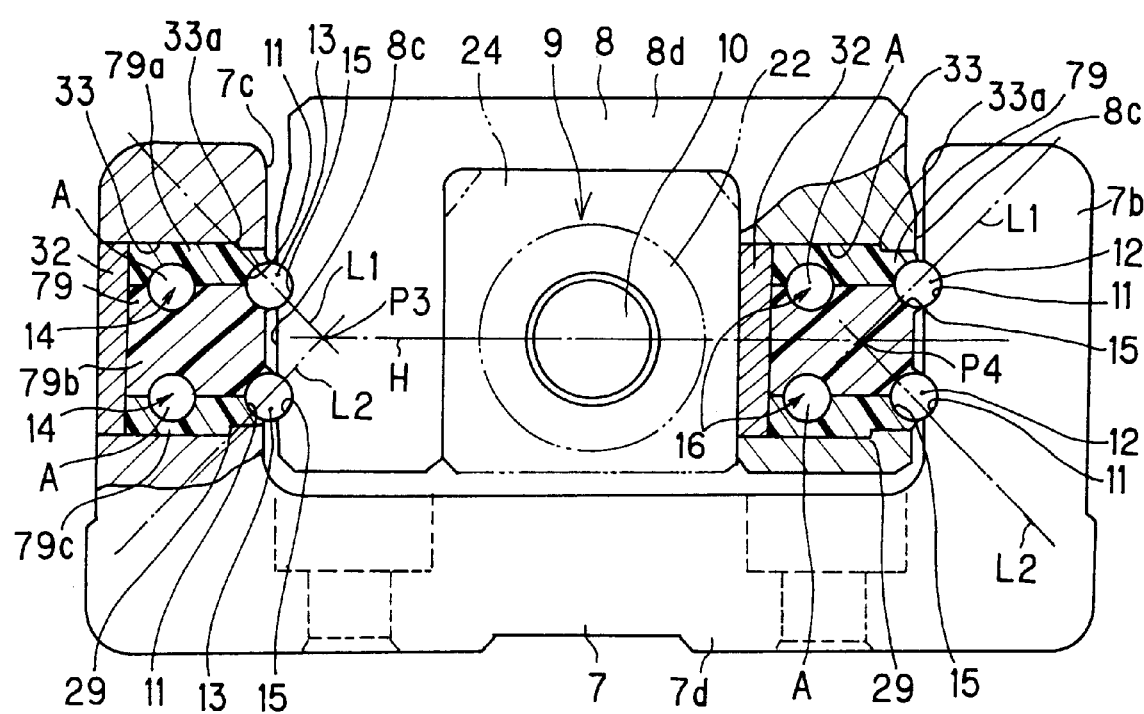
FIG. 20 is a sectional view of a rolling guide device formed with lateral two rows of rolling member (ball) rolling grooves.

FIG. 20 is a partial sectional view of a drive system using a rolling guide device of a further embodiment of the present invention. The rolling guide device of this embodiment comprises, like the rolling guide device shown in FIGS. 1 to 3, an outer rail 7 as track rail and an inner rail 8 as movable rail supported to be slidable in the longitudinal direction of the outer rail 7, and hence, like reference numerals are added to elements or members corresponding to those shown in FIGS. 1 to 3. The embodiment of FIG. 20 is provided with a ball screw 9 for driving the inner rail 8.

In the rolling guide device of the aforementioned embodiment, although the outer rail 7 and the inner rail 8 are formed with a single ball rolling groove in each side portion thereof, in the rolling guide device of this embodiment, the outer rail 7 and the inner rail 8 are formed with two ball rolling grooves 11, 11 (a total of four grooves) in each side portion thereof as shown in FIG. 20 in section. That is, in the rolling guide device of this embodiment, upper and lower two ball rolling grooves 11, 11 are formed respectively to each of the inside surfaces of the opposing ridges 7b, 7b of the outer rail 7, i.e., four ball rolling grooves 11, 11 for the outer rail 7. On the other hand, upper and lower two loaded ball rolling grooves 15, 15 are formed, respectively, in each of the outside surfaces of the opposing ridges 8b, 8b of the inner rail 8, i.e., four loaded ball rolling grooves 15, 15 for the inner rail 8 so as to oppose the ball rolling grooves 11, 11 of the outer rail 7, respectively.

An outer rail side ball circulation passage 14 for circulating the balls rolling between the inner rail 8 and the outer rail 7 is provided to one end side in the longitudinal direction of the outer rail 7 as like as that of the rolling guide device mentioned hereinbefore. This outer rail side ball circulation passage 14 is composed of upper and lower two passages, and more concretely, is composed of portions of the ball rolling grooves 11, 11, ball return passages A, A as rolling member return passages substantially parallel to the ball rolling grooves 11, 11 and a pair of rolling direction changing passages communicated with the ball rolling grooves 11, 11 and the ball return passages A, A.

An inner rail side ball circulation passage 16 for circulating the balls rolling between the inner rail 8 and the outer rail 7 is provided to one end side in the longitudinal direction of the outer rail 7 on the side opposing to the outer rail side ball circulation passage 14. This inner rail side ball circulation passage 16 is composed of upper and lower two passages, and more concretely, is composed of portions of the loaded ball rolling grooves 15, 15, ball return passages A, A as rolling member return passages substantially parallel to the loaded ball rolling grooves 15, 15 and a pair of rolling direction changing passages communicated with the ball rolling grooves 11, 11 and the ball return passages A, A.

In the illustration of FIG. 20, although it seems that the outer rail side ball circulation passage 14 and the inner rail side ball circulation passage 16 are positioned on the same sectional surface, in an actual arrangement, the outer rail side ball circulation passages 14 and the inner rail side ball circulation passage 16 are shifted in their positions as shown in FIG. 1.

The rolling direction changing passages, each having a semi-circular shape, constituting portions of the outer rail side ball circulation passage 14 and the inner rail side ball circulation passage 16 are formed in deflectors 79 mounted, as independent members, to the inner rail body 8d and the outer rail body 7d. The deflector 79 is utilized commonly for the outer rail side ball circulation passage 14 and the inner rail side ball circulation passage 16 and is provided with two vertical rolling direction changing passages. The deflector 79 is composed of three sections 79a, 79b and 79c which are splittable vertically along the rolling direction changing passage for easy formation of the vertical two tolling direction changing passages. These three splittable sections 79a, 79b and 79c are divided vertically at planes including central lines of the rolling direction changing passages. These three sections 79a, 79b and 79c are positioned and assembled with each other through fitting of dowels and holes formed to the respective sections. Furthermore, the deflector 79 is formed with a stepped abutment portion 29 to position the deflector 79 at the time when it is mounted to the inner rail side ball circulation passage 16 and the outer rail side ball circulation passage 14. Holes 33 are formed to the outer rail body 7d and the inner rail body 8d from the sides thereof, and stepped portions 33a are formed to inside surfaces of these holes 33. Accordingly, the deflector 79 is positioned with respect to the outer rail body 7d and the inner rail body 8d through the abutment of the stepped abutment portion 29 against the stepped portions 33a formed in the holes 33, i.e., outer rail body 7d and the inner rail body 8d.

The ball screw 9 is screw-engaged with the inner rail 8. This ball screw 9 is composed of a screw shaft 10 having an outer periphery on which a spiral ball rolling groove is formed, a nut (member) 22 having an inner periphery to which a ball circulation passage including a spiral loaded ball rolling groove corresponding to the ball rolling groove formed to the screw shaft 10 and assembled with the screw shaft 10 to be relatively movable thereto, and a number of balls arranged in the ball circulation passage and circulating in accordance with the relative movement of the nut member 22 with respect to the screw shaft 10.

Figure 21:
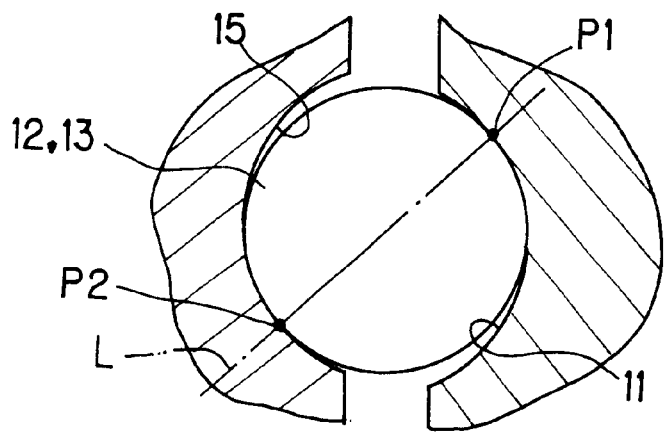
FIG. 21 is a view showing a contacting state of a ball to a ball rolling groove and a loaded ball rolling groove (circular-arc groove)

FIG. 21 illustrates a contacting state of the ball rolling groove 11, the loaded ball rolling groove 15 and the ball 12 or 13. The ball rolling groove 11 is formed as a single circular groove, so-called, circular arc groove, having a diameter slightly larger than a diameter of the ball so that the ball 12 (13) contacts the ball rolling groove 11 at one point P1. On the other hand, the loaded ball rolling groove 15 is formed as a single circular groove, so-called, circular arc groove, having a diameter slightly larger than a diameter of the ball so that the ball 12 (13) contacts the loaded ball rolling groove 15 at one point P2. Further, it is to be noted that a line L connecting the contact point P1 at which the ball 12 (13) and the ball rolling groove 11 are contacted and the contact point P2 at which the ball 12 (13) and the loaded ball rolling groove 11 are contacted is defined herein as contact angle line L. In this meaning, the contact angle lines L1, L2, L3 and L4 will be defined as shown in FIG. 20.

That is, with reference to FIG. 20, the mutually opposing two ball rolling grooves 11, 11 and the two loaded ball rolling grooves 15, 15 are offset from each other so that the vertical two lines L1 and L2 are inclined towards the horizontal line H passing the center of the screw shaft 10 while reducing a distance therebetween.

Further, it is desired that a contact angle constituted by the contact angle line L1 (L2) and the horizontal line H is approximately 45o. The center of the screw shaft 10 is positioned on the line passing the intermediate portion between the ball rolling grooves 11, 11 and on the central line of a span of the loaded ball rolling grooves 15, 15. Furthermore, it is desired that the center of the screw shaft 10 (center of the thrust force of the ball screw 9) is also positioned on a line connecting a point P3 of the left side contact angle lines L1 and L2 and a point P4 of the right side contact angle lines L1 and L2.

The moment load as shown in FIG. 8 will be easily loaded on the rolling guide device of the present invention, and accordingly, the vertical load will be also easily born by the balls 12 and 13. However, the contact angle lines L1 and L2 between the balls 12, 13 and the ball rolling grooves 11, 11 and between the balls 12, 13 and the loaded ball rolling grooves 15, 15 are inclined with respect to the horizontal line H, thus the vertical load acting on the inner rail 7 being effectively born by the balls 12, 13. For this reason, the moment load as shown in FIG. 8 can be surely loaded. Particularly, by setting the inclination angle to 45o, loads acting on the inner rail 7 from vertical and lateral four directions can be effectively supported by the balls 12 or 13. Furthermore, the ball screw 9 may be smoothly operated by positioning the center of the thrust force of the ball screw 9 on the line connecting the crossing point P3 of the left side contact angle lines L1 and L2 and the crossing point P4 on the right side contact angle lines L1 and L2.

Figure 22:
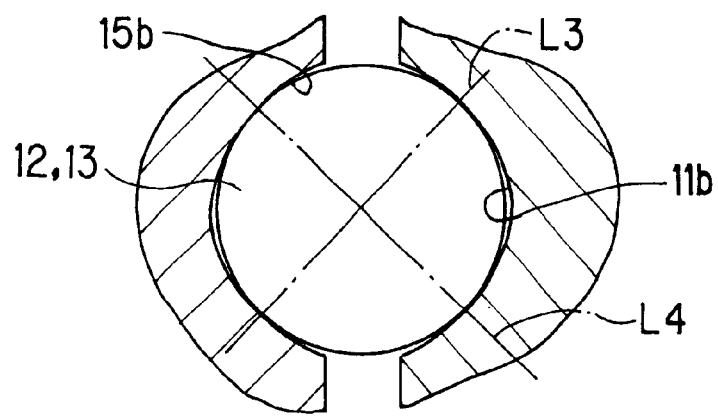
FIG. 22 is a view showing a contacting state of a ball to a ball rolling groove and a loaded ball rolling groove (Gothic-arch groove)

FIG. 22 illustrates a contacting state of a ball rolling groove 11b, a loaded ball rolling groove 15b and the ball 12 (13) in a rolling guide device in which one ball rolling groove 11b and one loaded ball rolling groove 15b are formed laterally as like as the rolling guide device shown in FIGS. 1 and 3. The ball rolling groove 11b and the loaded ball rolling groove 15b are each formed as a Gothic arch groove. That is, by forming so-called Gothic arch groove in combination of the ball rolling groove 11b and the loaded ball rolling groove 15b into two circular arcs, two contact angle lines L3 and L4 inclined from the horizontal line H can be obtained to thereby effectively support the vertical load by the ball 12, 13.

Figure 23:
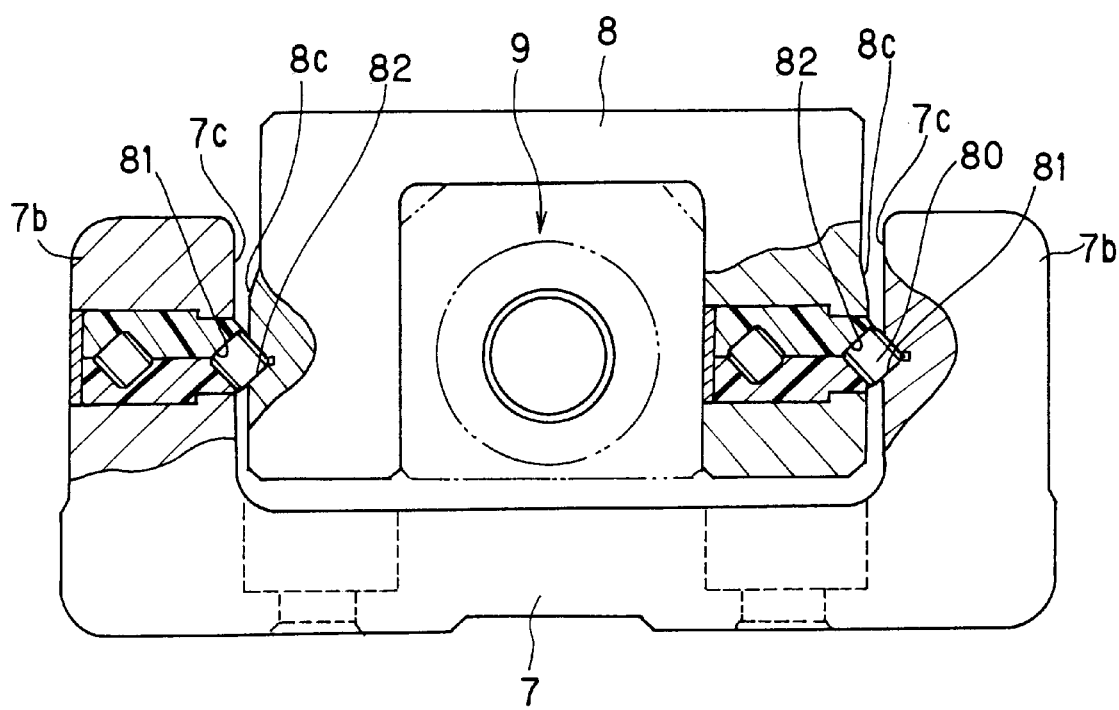
FIG. 23 is a sectional view of one example of a rolling guide device using rollers as rolling members.

FIG. 23 is an illustration of one embodiment, partially in section, of an essential portion of a drive system utilizing a rolling guide device using rollers 80 as rolling members. In this embodiment, the rollers 80 are utilized in place of the balls 12, 13 in the former embodiments. In this embodiment of FIG. 23, the outer rail 7 is provided with ridges 7b, 7b as mentioned before having opposing inside surfaces 7c, 7c to which roller rolling grooves 81, each having a V-shaped section with opening angle of 90°, are formed, respectively. On the other hand, the inner rail 8 has the opposing outside surfaces 8c, 8c to which loaded roller rolling grooves 82, each having a V-shaped section with opening angle of 90°, are formed, respectively. Therefore, a roller rolling passage having substantially a square cross section is defined between the roller rolling groove 81 and the loaded roller rolling groove 82. Within this roller rolling passage, a plurality of rollers 80, 80,—are arranged in shape of cross (cross arrangement) so that axes of the adjacent two rollers 80 cross each other.

The structure of this embodiment other than the above mentioned structure is substantially the same as that of the rolling guide device mentioned with reference to FIGS. 1 to 3, so that the description thereof is omitted herein by adding the same reference numerals to the corresponding portions or elements.

According to this embodiment, in which the rollers 80, 80,—are arranged in crossing shape, the rollers 80 can effectively support the vertical load.

Figure 24:
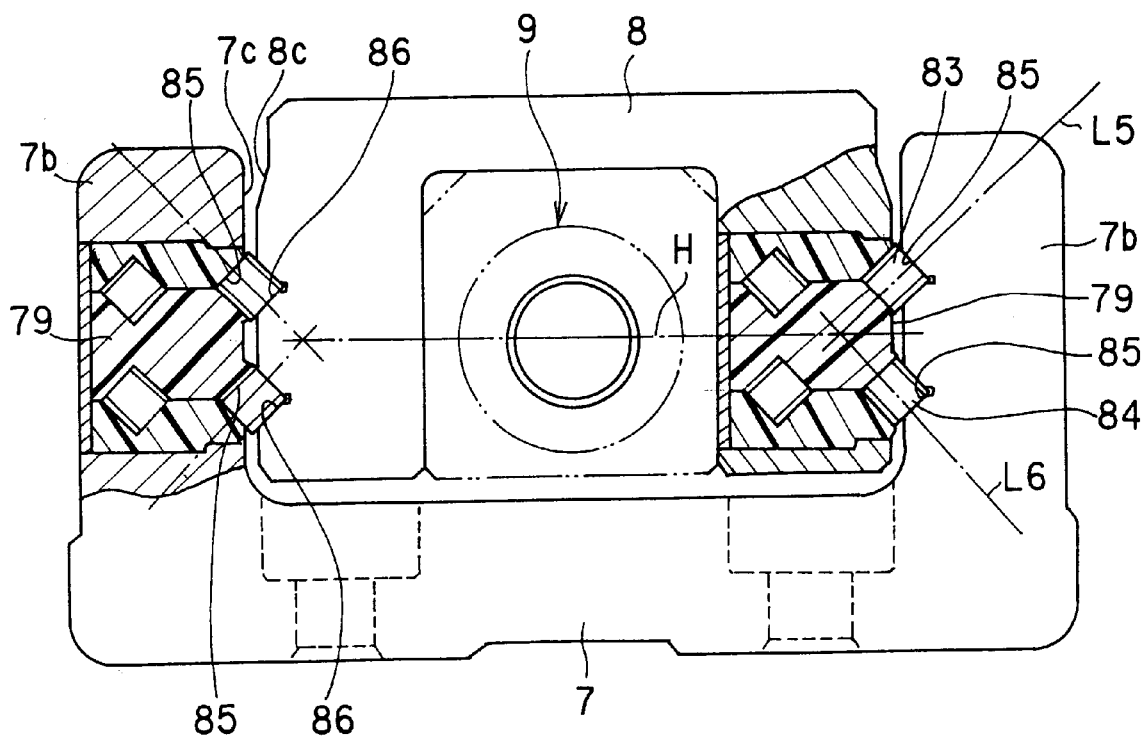
FIG. 24 is a sectional view of another example of a rolling guide device using rollers as rolling members.
Figure 25:
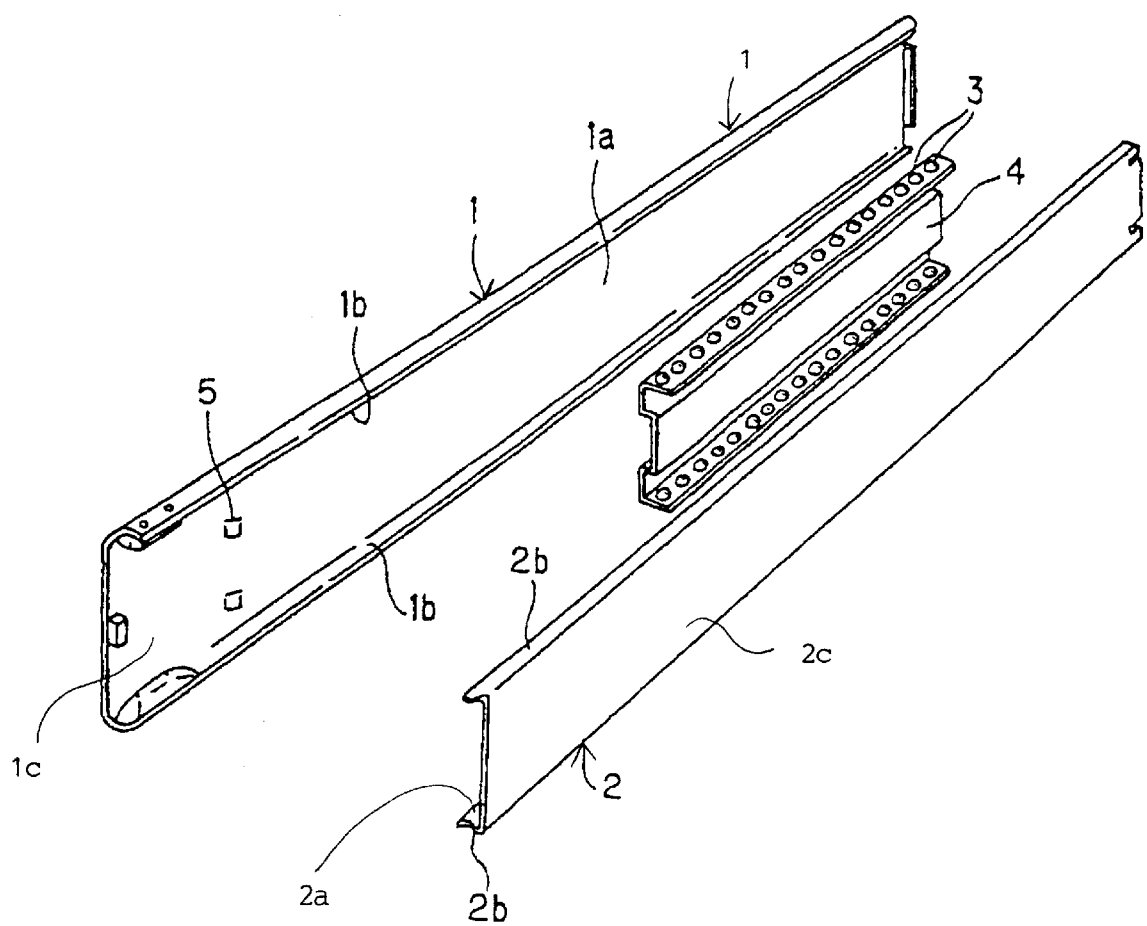
FIG. 25 is a perspective view showing a slide rail having a conventional structure.

FIG. 24 is an illustration of another embodiment, partially in section, of an essential portion of a drive system utilizing a rolling guide device using rollers 83, 84 as rolling members. In this embodiment, the outer rail 7 is provided with ridges 7b, 7b having opposing inside surfaces 7c, 7c each which vertical two roller rolling grooves 81, 81 each having a V-shaped section with opening angle of 90°, are formed, respectively. On the other hand, the inner rail 8 has the opposing outside surfaces 8c, 8c each which two loaded roller rolling grooves 82, 82 each having a V-shaped section with opening angle of 90°, are formed, respectively. Therefore, vertical two roller rolling passages each having substantially square cross section are defined between the roller rolling grooves 81, 81 and the loaded roller rolling grooves 82, 82. Within these roller rolling passages, a plurality of rollers 83, 84 are arranged in parallel to each other (parallel arrangement) so that axes of the adjacent two rollers are parallel to each other.

The rollers 83 disposed in the upper side roller rolling passage are arranged so as to support the load acting in the direction shown by the line L5 (different from the horizontal line H), and on the other hand, the rollers 84 disposed in the lower side roller rolling passage are arranged so as to support the load acting in the direction shown by the line L6 (different from the horizontal line H). Angles constituted by the line L5 and the horizontal line H and by the line L6 and the horizontal line H are defined approximately 45o, respectively. The structure of this embodiment of FIG. 24 other than the above-mentioned structure is substantially the same as that of the rolling guide device mentioned with reference to FIG. 20 so that the description thereof is omitted herein by adding the same reference numerals to the corresponding portions or elements.

According to this embodiment of FIG. 24, in which the rollers 83 and 84 are arranged in the vertical two roller rolling passages and the directions along which the rollers 83 and 84 can bear the loads are inclined with respect to the horizontal line H, so that the rollers 83 and 84 can effectively support the vertical loads.

According to the various preferred embodiments or examples of the present invention mentioned above, the track rail side rolling member circulation passage and the movable rail side rolling member circulation passage, in which the rolling members rolling between the track rail and the movable rail circulate, are formed in the track rail and the movable rail, respectively. Therefore, when the movable rail slides with respect to the track rail, the rolling members arranged between the track rail and the movable rail endlessly circulate in the track rail side rolling member circulation passage and the movable rail side rolling member circulation passage while rolling therealong. As mentioned, because the rolling members circulate in the endless manner, even if the rolling member slides during the rolling motion, there is no causing of a case that a cage is shifted from the initial position as in the conventional structure, and hence, a large expansion (contraction) stroke can be realized. Furthermore, in an optional expanded (contracted) attitude, there remains a relatively large distance between the track rail side rolling member circulation passage and the movable rail side rolling member circulation passage, so that a rolling guide device, which can bear even the moment load, can be realized.

Furthermore, according to the present invention, because the linear motor means is incorporated between the track rail and the movable rail, no specific ball screw or like mechanism is needed, so that the movable rail can be moved at high speed with reduced noise.

It is further to be noted that the present invention is not limited to the described embodiments and many other changes and modifications may be made without departing from the scopes of the appended claims.

What is claimed is:

1. A rolling guide device comprising:
   a track rail formed with a rolling member rolling surface extending along a longitudinal direction thereof;
   a movable rail formed with a loaded rolling member rolling surface extending along a longitudinal direction thereof so as to oppose the rolling member rolling surface of the track rail;
   a track rail side rolling member circulation passage formed in the track rail so as to circulate the rolling members rolling between the track rail and the movable rail;
   a movable rail side rolling member circulation passage formed in the movable rail so as to circulate the rolling members rolling between the track rail and the movable rail; and
   a number of rolling members disposed and arranged in the track rail side rolling member circulation passage and the movable rail side rolling member circulation passage,
   wherein said track rail side rolling member circulation passage is formed in one longitudinal end side of the track rail and said movable rail side rolling member circulation passage is formed in one longitudinal end side, opposing in said one end side of the track rail, of the movable rail.

2. A rolling guide device comprising:
   a track rail formed with a rolling member rolling surface extending along a longitudinal direction thereof;
   a movable rail formed with a loaded rolling member rolling surface extending along a longitudinal direction thereof so as to oppose the rolling member rolling surface of the track rail;
   a track rail side rolling member circulation passage formed in the track rail so as to circulate the rolling members rolling between the track rail and the movable rail;
   a movable rail side rolling member circulation passage formed in the movable rail so as to circulate the rolling members rolling between the track rail and the movable rail; and
   a number of rolling members disposed and arranged in the track rail side rolling member circulation passage and the movable rail side rolling member circulation passage,
   wherein said track rail has an opened recess having a ⊐-shaped section and has inside surfaces to which said rolling member rolling surfaces are formed, said movable rail is fitted into the recess of the track rail, and said movable rail has outside surfaces to which the loaded rolling member rolling surfaces are formed so as to oppose to the rolling member rolling surfaces formed in the track rail inside surfaces.

3. A rolling guide device according to claim 2, wherein said track rail side rolling member circulation passage is provided with a rolling member return passage substantially parallel to said rolling member rolling surface and a rolling direction changing passage communicating the rolling member rolling surface and the rolling member return passage, said movable rail side rolling member circulation passage being provided with a rolling member return passage substantially parallel to said loaded rolling member rolling surface and a rolling direction changing passage communicating the rolling member rolling surface and the rolling member return passage, said rolling direction changing passages of the track rail side rolling member circulation passage and the movable rail side rolling member circulation passage are formed in a deflector which is formed independently from a track rail body and a movable rail body, and said deflector is fitted in holes formed to the track rail body and movable rail body from side portions thereof.

4. A rolling guide device according to claim 3, wherein said return passages are drilled to the track rail body and the movable rail body from longitudinal end portions thereof.

5. A rolling guide device according to claim 3, wherein said deflector is composed of a plurality of sections splittable along the rolling direction changing passages.

6. A rolling guide device according to claim 3, wherein said deflector is made of a synthetic resin.

* * * * *